United States Patent [19]

Chen

[11] Patent Number: 5,557,344
[45] Date of Patent: *Sep. 17, 1996

[54] MULTI-BEAM GROUP ELECTRON GUN FOR COLOR CRT

[75] Inventor: Hsing-Yao Chen, Barrington, Ill.

[73] Assignee: Chunghwa Picture Tubes, Ltd., Taoyuan, Taiwan

[*] Notice: The term of this patent shall not extend beyond the expiration date of Pat. No. 5,350,978.

[21] Appl. No.: 192,819

[22] Filed: Feb. 7, 1994

[51] Int. Cl.$^6$ ........................................ H04N 3/28
[52] U.S. Cl. ..................... 348/809; 348/805; 313/409
[58] Field of Search ........................... 315/13.1, 13.11, 315/14, 15, 368.11, 368.12, 368.13; 313/409, 411, 414, 415, 364, 402, 426, 427, 428, 441; 348/805, 808, 809; H04N 5/68, 3/28

[56] References Cited

U.S. PATENT DOCUMENTS

| | | |
|---|---|---|
| 3,499,982 | 3/1970 | O'neal . |
| 5,350,978 | 9/1994 | Chen .................. 315/13.1 X |

FOREIGN PATENT DOCUMENTS

| | | | |
|---|---|---|---|
| 0175248 | 10/1983 | Japan ..................... 313/409 |
| 0184242 | 10/1983 | Japan ..................... 313/414 |
| 0206034 | 12/1983 | Japan ..................... 313/409 |
| 0049540 | 3/1985 | Japan ..................... 313/441 |

Primary Examiner—David E. Harvey
Attorney, Agent, or Firm—Emrich & Dithmar

[57] ABSTRACT

A multi-beam electron gun for a color cathode ray tube (CRT) includes a plurality of vertically spaced, horizontal inline beams, where each inline array of beams provides the three primary colors of red, green and blue and adjacent inline beam arrays simultaneously trace adjacent horizontal scan lines on the color CRT's display screen. The beams in each horizontal inline array of beams are focused on a common spot on the display screen, with the three beams deflected across the screen in unison. Each inline array of beams is modulated in accordance with that portion of the video image which they form allowing adjacent, vertically spaced inline arrays to write different video image information on the screen in simultaneously forming adjacent portions of the color video image. In the beam-forming region of the electron gun, a charged grid includes an array of apertures including at least upper and lower horizontally aligned apertures for passing inline arrays of beams. Vertical spacing between each of the upper and lower apertures is given by $S_V$ and horizontal spacing between vertically aligned groups of apertures is given by $S_H$, where:

$$\tfrac{1}{20} S_H \leq S_V \leq \tfrac{1}{2} S_H.$$

Simultaneously providing color video image information on more than one horizontal scan line allows for a reduction in horizontal scan frequency and associated magnetic deflection yoke operating criteria, and also increases beam dwell time on the screen's phosphor elements allowing for a reduction in individual beam current without sacrificing video image brightness.

22 Claims, 12 Drawing Sheets

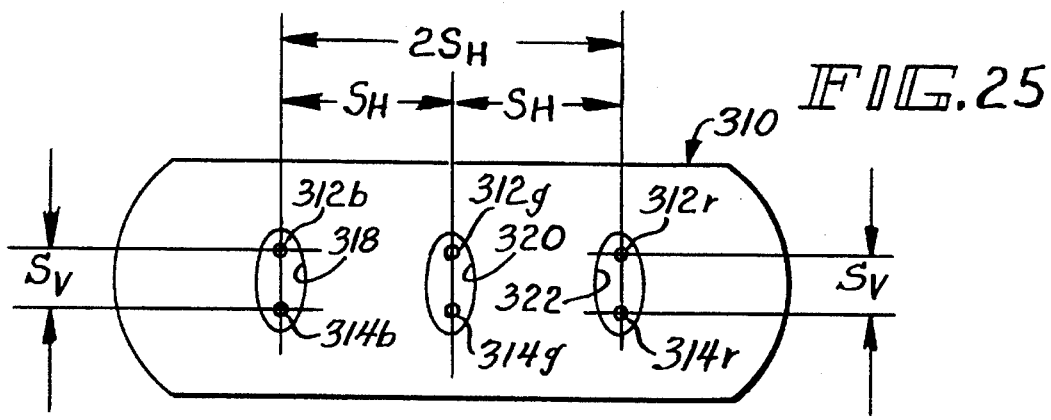
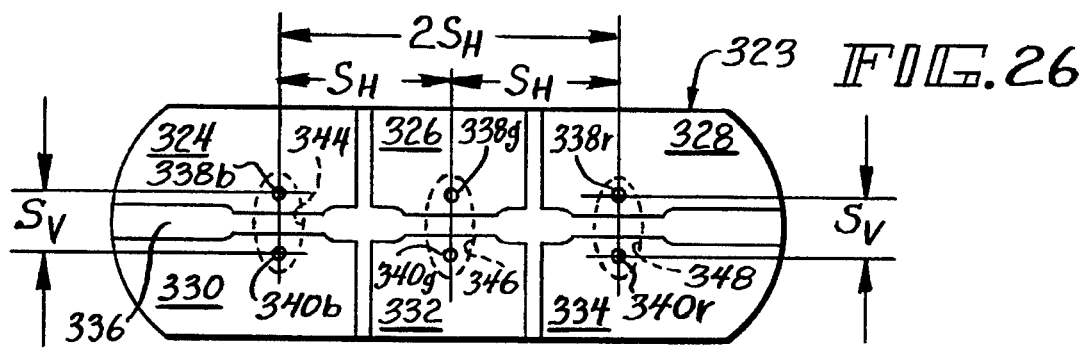
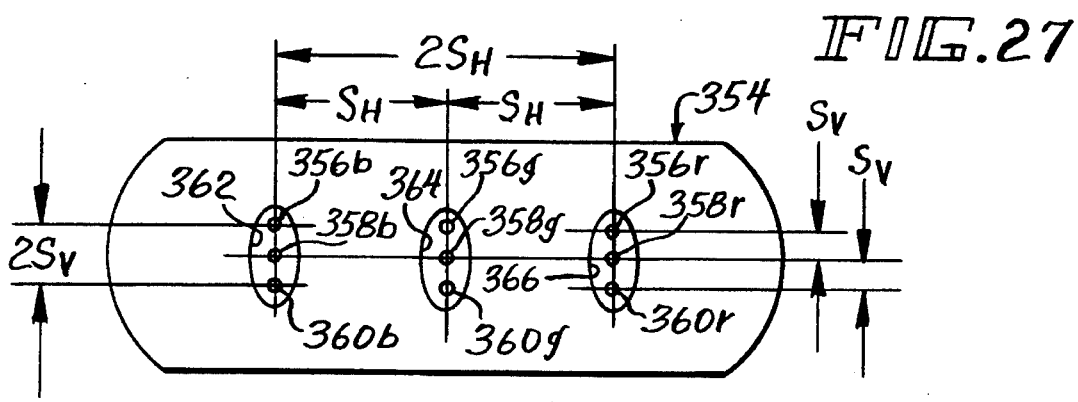
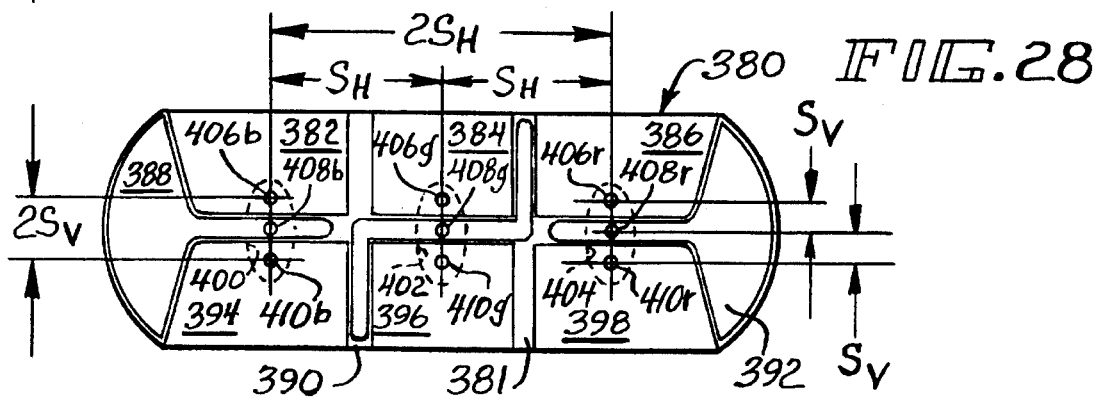

5,557,344

MULTI-BEAM GROUP ELECTRON GUN FOR COLOR CRT

FIELD OF THE INVENTION

This invention relates generally to multi-beam electron guns such as used in color cathode ray tubes (CRTs) and is particularly directed to an electron gun having grouped electron beams for simultaneously providing a portion of the color video image on the CRT's screen on more than one horizontal scan line.

BACKGROUND OF THE INVENTION

The clear path for future color CRT development is in the direction of high definition television (HDTV) displays. This is true whether operating in accordance with the NTSC standard or the PAL format. Regardless of the color television system, a HDTV display requires a higher frequency magnetic deflection yoke and high video image resolution and brightness. Increased display performance does not come without a price.

Increasing the scan frequency of the CRT's magnetic deflection yoke requires higher deflection input power to the yoke as well as a more expensive yoke assembly. To provide acceptable brightness and resolution in a large 16:9 color CRT, higher beam current and improved video image resolution are required. These enhancements typically require a larger CRT envelope neck size to accommodate a larger electron gun. Increasing the size of the CRT envelope is contrary to current trends which seek to reduce the non-display screen portions of the CRT. One approach to providing acceptable image brightness involving the use of higher beam currents employs a dispenser cathode which affords high electron emission densities. However, the use of a dispenser cathode substantially increases the cost of the cathode, i.e., on the order of 50 times more than that of a conventional oxide cathode, to the point where these exotic cathodes are at present not commercially viable for use in a CRT. While some of the aforementioned approaches have been adopted in high definition television (HDTV) CRT's, the increased cost and complexity of the resulting CRT reduces its commercial competitiveness relative to other HDTV display technologies such as liquid crystal displays (LCDs), plasma display panels (PDPs), etc.

Referring to FIG. 1, there is shown an isometric view partially in phantom of a typical prior art multi-beam electron gun 10 for use in a color CRT. A sectional view of the electron gun 10 shown in FIG. 1 taken along site line 2—2 therein is shown in FIG. 2. Electron gun 10 includes a plurality of spaced, inline cathodes 12, 14 and 16 which each provide respective pluralities of energetic electrons in the general direction of a G1 control grid 18 having a plurality of spaced, inline apertures 18a, 18b and 18c. The energetic electrons are directed through apertures 18a, 18b and 18c and toward a G2 screen grid 20 having a corresponding array of inline apertures 20a, 20b and 20c. The G1 control grid 18 and the G2 screen grid 20 comprise a beam-forming region (BFR) 46 for forming the pluralities of energetic electrons into three inline electron beams 22, 24 and 26 shown in dotted-line form. Electron gun 10 further includes a G3 grid 28 and a G4 grid 36 aligned along the electron gun's longitudinal axis. The G3 grid 28 typically includes a plurality of inline apertures 28a, 28b and 28c in facing relation to the G2 screen grid 20 as well as an inner metal plate 32 containing a plurality of inner inline apertures 30a, 30b and 30c. The G3 grid further includes a horizontally aligned, elongated chain link-shaped common aperture 34 in facing relation to the G4 grid 36. The G4 grid 36 similarly includes a horizontally aligned, elongated chain link-shaped common aperture 39 in facing relation with the G3 grid 28. The G4 grid 36 further includes an inner metal plate 38 containing three inline apertures 36a, 36b and 36c which respectively pass electron beams 22, 24 and 26. The combination of the G3 grid 28 and the G4 grid 36 form a high voltage focus lens 48 for accelerating and focusing the three electron beams 22, 24 and 26 on the display screen, or face plate, 40 of the CRT. Disposed on the inner surface of display screen 40 is a phosphor layer 52 which emits light in response to the electron beams incident thereon. The G1 and G2 grids 18, 20 are respectively coupled to and charged by $V_{G1}$ and $V_{G2}$ voltage sources 41 and 43. The G3 and G4 grids 28, 36 are respectively coupled to and charged by focus ($V_F$) and accelerating ($V_A$) voltage sources 45 and 47.

An elevation view of the CRT's display screen 40 is shown in FIG. 3 which also illustrates the horizontal scan lines 42 over which the electron beams are displaced by means of the CRT's magnetic deflection yoke (not shown for simplicity) in tracing out a video image on the display screen. For simplicity, only 12 scan lines are shown in the figure, it being understood that there are many more horizontal scan lines in the typical CRT. The beginning of electron beam trace for the first horizontal scan line is shown by the arrow in the upper left-hand corner of FIG. 3, while the beginning of electron beam trace of the last horizontal scan line is shown by the arrow in dotted-line form in the lower left-hand corner of the figure. The electron beams are converged in the form of a spot 44 on the display screen 40 which is traced across the display screen in a raster-like manner in proceeding from left to right and from top to bottom as viewed in FIG. 3. Each horizontal sweep of the electron beams of faceplate 40 provides a single horizontal line of the video image displayed thereon. Electron gun 10 is typical of those used in conventional inline color CRTs which generally suffer from the design and operating limitations discussed above.

The present invention addresses the aforementioned limitations of the prior art by providing a multi-beam group (MBG) electron gun for use in a color CRT wherein two or more vertically spaced, horizontal inline electron beam arrays provide the primary colors of red, green and blue to adjacent horizontal scan lines on the CRT display screen permitting two or more adjacent lines of the video image to be simultaneously formed on the display screen.

OBJECTS AND SUMMARY OF THE INVENTION

Accordingly, it is an object of the present invention to provide a multi-beam electron gun with vertically aligned, grouped electron beams for simultaneously providing color video image information on adjacent, vertically spaced horizontal scan lines.

It is another object of the present invention to increase the pixel dwell time of the electron beams in an inline color CRT to allow for a reduction in horizontal scan frequency and peak beam current without sacrificing video image brightness while improving video image resolution.

Yet another object of the present invention is to relax magnetic deflection yoke and cathode emission requirements in a multi-beam color CRT while maintaining high electron beam spot resolution without increasing CRT neck size or deflection power requirements.

A further object of the present invention is to store received color video image information for subsequent recall and display on a first horizontal scan line simultaneous with the display of additional stored video image information on a second adjacent scan line to increase the portion of the video image displayed with each horizontal scan of the CRT screen.

These objects of the present invention are achieved and the disadvantages of the prior art are eliminated by an inline electron gun for a multi-beam color cathode ray tube (CRT) including a display screen whereon a video image is formed by sweeping a plurality of horizontally aligned electron beams over a plurality of vertically spaced, horizontal scan lines in a raster-like manner, wherein each electron beam provides one of the three primary colors of red, green or blue of the video image, the electron gun comprising: a plurality of cathodes for providing energetic electrons; a beam forming region (BFR) disposed adjacent to the cathodes and including first and second spaced, charged grids respectively having first and second arrays of spaced apertures for forming the energetic electrons into a plurality of beams, wherein each of the first and second arrays of apertures include upper and lower horizontally aligned apertures for passing horizontally aligned electron beams providing the three primary colors of red, green and blue for upper and lower horizontal scan lines, respectively, and wherein the apertures in the first and second arrays are further grouped in vertical alignment so as to form vertically grouped electron beams with the electron beams in each vertical group providing one of the primary colors on a respective horizontal scan line, wherein vertical spacing between adjacent upper and lower apertures is given by $S_V$ and horizontal spacing between vertically aligned groups of apertures is given by $S_H$, with $$\frac{1}{20} S_H \leq S_V \leq \frac{1}{2} S_H;$$

a focusing lens disposed intermediate the BFR and the CRT's display screen for focusing the electron beams on the display screen; and a convergence arrangement disposed intermediate the focusing lens and the display screen for converging the electron beams into an upper and a lower spot on the display screen, wherein the upper and lower spots are swept over upper and lower horizontal scan lines, respectively.

The present invention further contemplates a G1 control grid for a color cathode ray tube (CRT) adapted to receive energetic electrons from a cathode and to form the energetic electrons into a plurality of electron beams for horizontal displacement over a plurality of scan lines in a raster-like manner across a display screen of the CRT in forming a video image on the screen, the grid comprising first, second and third horizontally aligned upper conductive portions adapted for coupling to respective first video signal sources and first, second and third horizontally aligned lower conductive portions adapted for coupling to respective second video signal sources. The G1 control grid further includes an insulating arrangement disposed intermediate adjacent conductive portions for electrically isolating the conductive portions. The inventive G1 control grid further includes first, second and third horizontally aligned upper apertures are each disposed within a respective one of the upper conductive portions, wherein each of the upper apertures passes a respective upper electron beam forming one of the primary colors of red, green and blue of a video image on the display screen, with the upper electron beams horizontally displaced over a first upper scan line; and first, second and third horizontally aligned lower apertures each disposed within a respective one the lower conductive portions, wherein each of the lower apertures passes a respective lower electron beam forming one of the primary colors of red, green and blue of a video image on the display screen, with the upper electron beams horizontally displaced over a second lower scan line. Each group of first, second and third upper and lower apertures are vertically aligned and pass electron beams forming the same primary color on the display screen. The vertical spacing between adjacent upper and lower apertures is given by $S_V$ and the horizontal spacing between vertically aligned groups of apertures is given by $S_H$, where $\frac{1}{20} S_H \leq S_V \leq \frac{1}{2} S_H$.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 25 is an elevation view of a G2 screen grid in accordance with a preferred embodiment of the present invention;

FIG. 26 is an elevation view of a G1 control grid in accordance with a preferred embodiment of the present invention;

FIG. 27 is an elevation view of a G2 screen grid in accordance with yet another embodiment of the present invention; and FIG. 28 is an elevation view of a G2 control grid in accordance with yet another embodiment of the present invention.

DETAILED DESCRIPTION OF THE PREFERRED EMBODIMENTS

Figure 4:
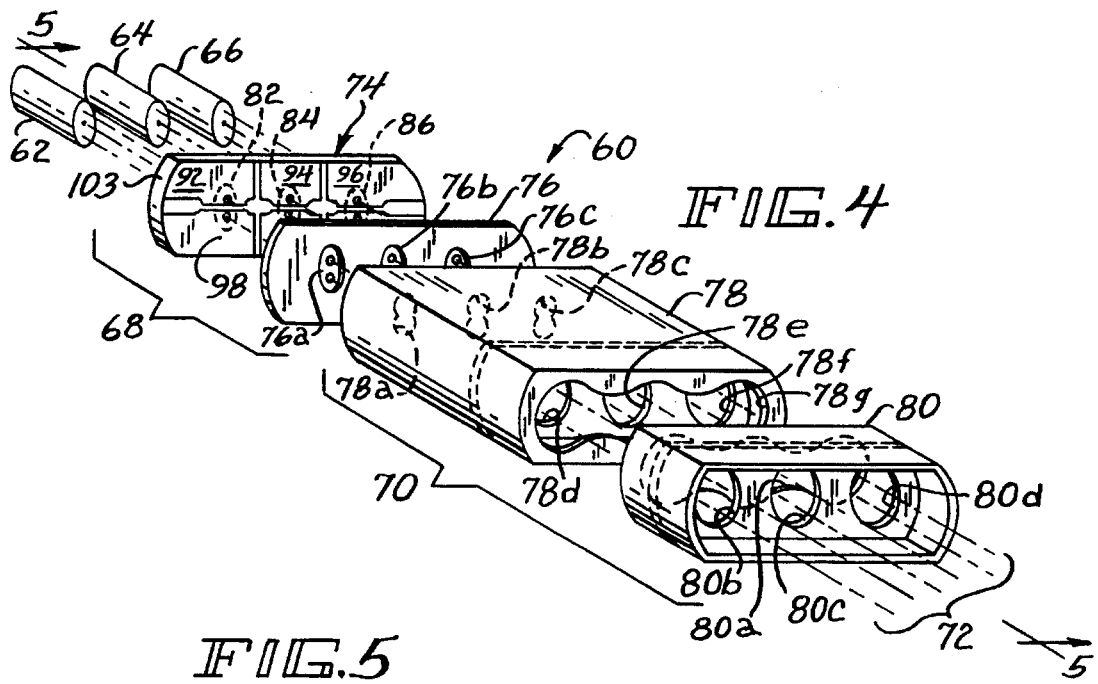
FIG. 4 is a simplified isometric view shown partially in phantom of a multi-beam group electron gun for use in a color CRT in accordance with one embodiment of the present invention.
Figure 5:
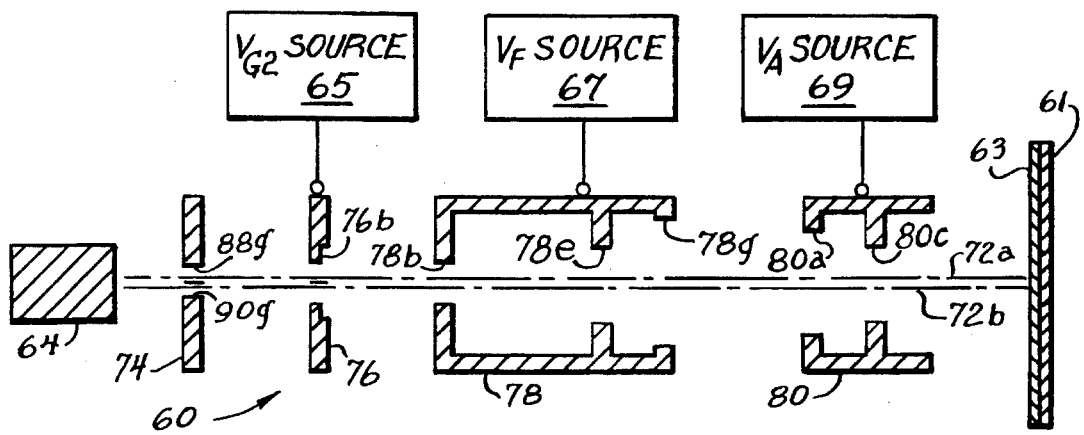
FIG. 5 is a generally vertical, longitudinal sectional view of the inventive multi-beam group electron gun shown in FIG. 4 taken along site line 5—5 therein.

Referring to FIG. 4, there is shown a simplified isometric view partially in phantom of a multi-beam group electron gun 60 for a color CRT in accordance with the principles of the present invention. FIG. 5 is a longitudinal vertical sectional view of the multi-beam group electron gun 60 shown in FIG. 4 taken along site line 5—5 therein. Electron gun 60 is of the bi-potential type and includes a plurality of inline cathodes 62, 64 and 66 for providing energetic electrons in the direction of a G1 control grid 74. Additional details of the G1 control grid 74 are shown in the elevation view of FIG. 7 and are described below. The G1 control grid 74 in combination with a G2 screen grid 76 provides a beam forming region (BFR) 68 in electron gun 60 for forming the energetic electrons into three pairs of vertically aligned electron beams 72. The center pair of electron beams are shown in the sectional view of FIG. 5 as an upper electron beam 72a and a lower electron beam 72b. Electron gun 60 further includes the combination of a G3 grid 78 and a G4 grid 80 which, in combination, form a high voltage focusing lens 70 for focusing the electron beams on the display screen 61 of a CRT. Disposed on the inner surface of display screen 61 is a phosphor layer, or coating, 63 for emitting light in response to the electron beams incident thereon in forming a video image on the display screen.

The G1 control grid 74 and the G2 screen grid 76 are both in the general form of flat plates having three pairs of vertically aligned apertures for passing the six electron beams 72. The G2 screen grid 76 includes three inline coined portions 76a, 76b and 76c each having a respective pair of vertically aligned beam-passing apertures. The G1 control grid 74 is comprised of a non-conductive ceramic substrate 103 having first, second and third coined, or recessed, portions 82, 84 and 86 in facing relation to the three cathodes 62, 64 and 66. Disposed within the first coined portion 82 and extending through ceramic substrate 103 are a pair of vertically aligned apertures 88b and 90b. Similarly, respectively disposed within the second and third coined portions 84 and 86 and extending through the ceramic substrate 103 are second and third pairs of vertically aligned apertures 88g, 90g and 88r and 90r. Apertures 88b and 90b pass a pair of blue electron beams; apertures 88g and 90g pass green electron beams; and apertures 88r and 90r pass red electron beams. Thus, the trio of upper apertures 88b, 88g and 88r pass three electron beams for generating the primary colors, while the lower trio of apertures 90b, 90g and 90r similarly pass three electron beams which form the primary colors on the display screen. In this embodiment as well as in the embodiments described below, the vertical spacing between adjacent apertures is on the order of 50 mils while the horizontal spacing between adjacent apertures is on the order of 200 mils as in conventional inline electron guns. In accordance with the present invention and as described in detail below, the three electron beams transitting upper apertures 88b, 88g and 88r are converged and focused on a first, upper spot on the display screen, while the electron beams transitting the lower apertures 90b, 90g and 90r are converged and focused on a second, lower spot. The upper electron beams are traced over a first, upper horizontal scan line by the CRT's magnetic deflection yoke, while the second set of electron beams are traced over a second lower, adjacent horizontal scan line on the CRT's display screen. This arrangement permits adjacent portions of a video image on the display screen 61 to be simultaneously formed by two or more pluralities of inline electron beams displaced across the display screen.

The G1 control grid 74 further includes six thin conductive portions 92, 94, 96, 98, 100 and 102 disposed on its surface facing the G2 screen grid 76. The conductive portions are formed on the G1 control grid's ceramic substrate 103 by affixing a thin conductive metallic layer to the surface of the ceramic substrate such as by brazing or cramping. A portion of the conductive layer is then removed in a conventional manner such as by chemical etching so as to form a continuous non-conductive insulating gap 104 separating the various conductive portions. Insulating gap 104 exposes the underlying ceramic substrate 103 and defines the six aforementioned conductive portions 92, 94, 96, 98, 100 and 102. Each of the conductive portions 92, 94, 96, 98, 100 and 102 encloses a respective one of the G1 control grid's beam-passing apertures 88b, 88g, 88r, 90b, 90g and 90r allowing each of the electron beams to be individually modulated by a respective video signal provided to each of the conductive portions.

Coupled respectively to the upper three conductive portions 92, 94 and 96 are $V_{1AB}$, $V_{1AG}$ and $V_{1AR}$ video signal sources 106, 108 and 110. Similarly, coupled respectively to the three lower conductive portions 98, 100 and 102 are $V_{1BB}$, $V_{1BG}$ and $V_{1BR}$ video signal sources 112, 114 and 116. Each of the aforementioned video signal sources provides a respective video signal to its associates conductive portion for modulating the electron beam passing through the aperture within that particular conductive portion. Thus, the $V_{1AB}$, $V_{1AG}$ and $V_{1AR}$ video signal sources 106, 108 and 110 respectively modulate the electron beams passing through apertures 88b, 88g and 88r. Similarly, the $V_{1BB}$, $V_{1BG}$ and $V_{1BR}$ video signal sources 112, 114 and 116 respectively modulate the electron beams passing through apertures 90b, 90g and 90r. In this manner, a first portion of a video image on the CRT's display screen is provided by the upper trio of electron beams passing through apertures 88b, 88g and 88r, while an adjacent, lower portion of a video image is simultaneously provided by the trio of electron beams passing through apertures 90b, 90g and 90r.

Figure 3:
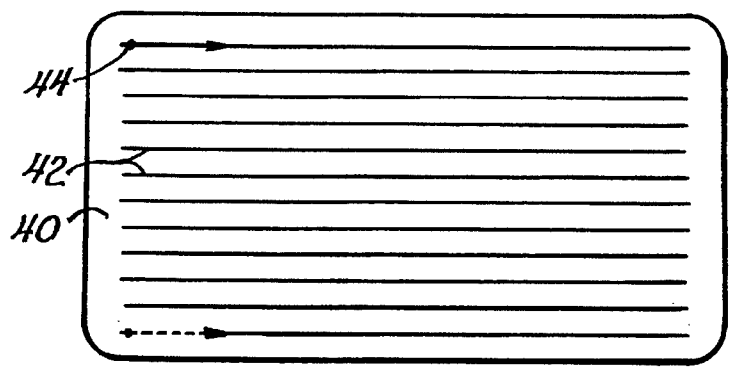
FIG. 3 is a simplified elevation view of a CRT display screen illustrating the manner in which the display screen is raster scanned by the electron beams of the electron gun of FIGS. 1 and 2 in forming a color image thereon.
Figure 1:
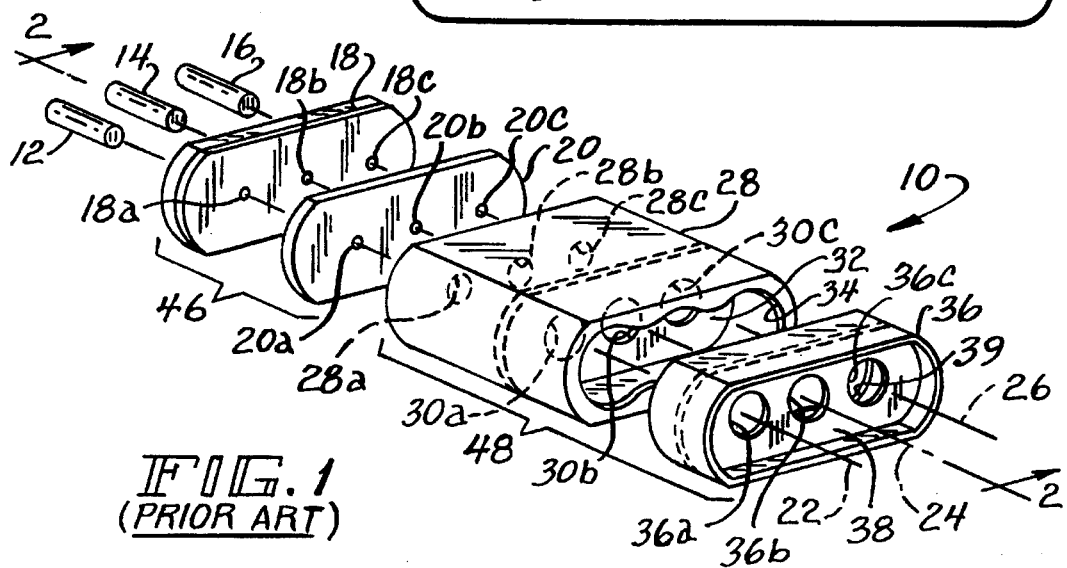
FIG. 1 is a simplified isometric view shown partially in phantom of a prior art multi-beam inline electron gun such as used in a conventional color CRT.
Figure 2:
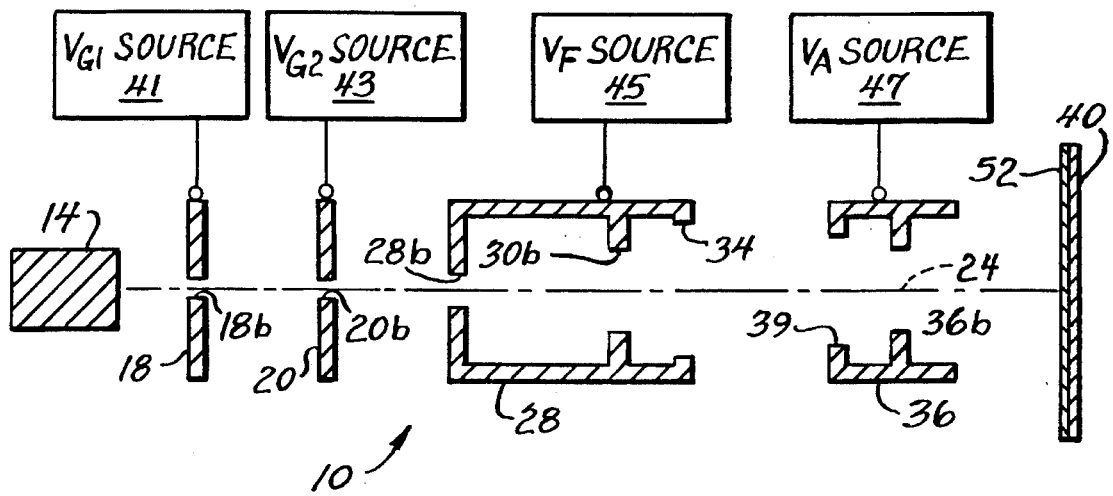
FIG. 2 is a longitudinal sectional view of the electron gun shown in FIG. 1 taken along site line 2—2 therein.
Figure 6:
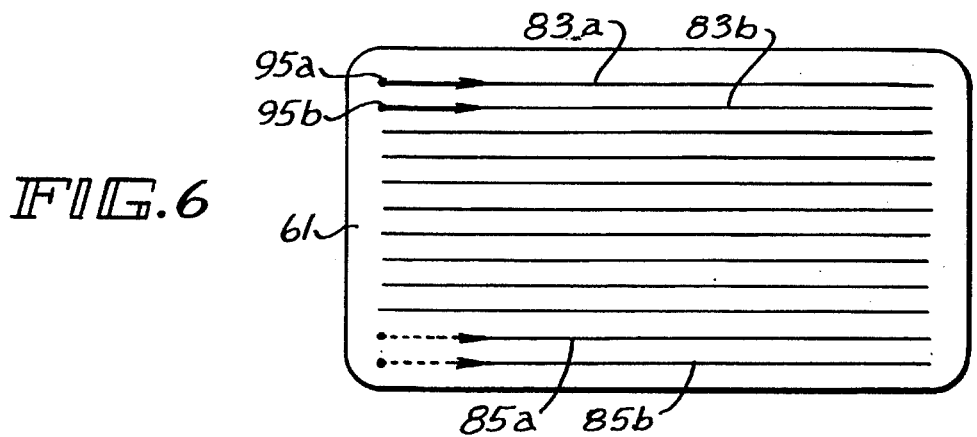
FIG. 6 is a simplified elevation view of a CRT display screen illustrating the manner in which the display screen is scanned by a plurality of electron beams of the electron gun of FIGS. 4 and 5 in accordance with one embodiment of the present invention.

Referring to FIG. 6, there is shown a simplified elevation view of the CRT's display screen 61 and the manner in which a video image is formed thereon by means of the electron gun 60 shown in FIGS. 4 and 5. As shown in the upper left-hand portion of FIG. 6, the upper trio of electron beams described above are converged upon the display screen 61 in the form of an upper spot 95a, while the trio of lower electron beams are converged upon the display screen in the form of a lower spot 95b. The upper and lower electron beam spots 95a, 95b are in vertical alignment and are displaced rightward in unison as shown by the direction of the arrows in the figure along respective horizontal scan line 83a and 83b by means of the CRT's magnetic deflection yoke which is not shown for simplicity. When the upper and lower trios of electron beams reach the right-hand margin of the display screen 61, they are quickly deflected leftward to begin tracing third and fourth scan lines on the display screen. This scanning and retrace sequence continues until the upper and lower trios of electron beams scan the last two horizontal scan lines 85a and 85b as shown in dotted-line form in the lower left-hand portion of FIG. 6. Upon completion of scanning the bottom two scan lines 85a, 85b on display screen 71, the upper and lower trios of electron beams undergo retrace by means of the magnetic deflection yoke and are positioned so as to initiate re-trace of the first two scan lines 83a, 83b at the top of the display screen. By simultaneously tracing two or more horizontal scan lines, electron beam scan frequency and deflection frequency rate are reduced as are the yoke power requirements. This allows for the use of a simpler, cheaper magnetic deflection yoke. The reduction in beam scan frequency gives rise to a corresponding increase in the "dwell time" of the electron beams on the display screen's phosphor elements. Increasing electron beam dwell time allows for a corresponding reduction in electron beam peak current density giving rise to a corresponding improvement in electron beam spot size and video image resolution without sacrificing video image brightness.

Figure 7:
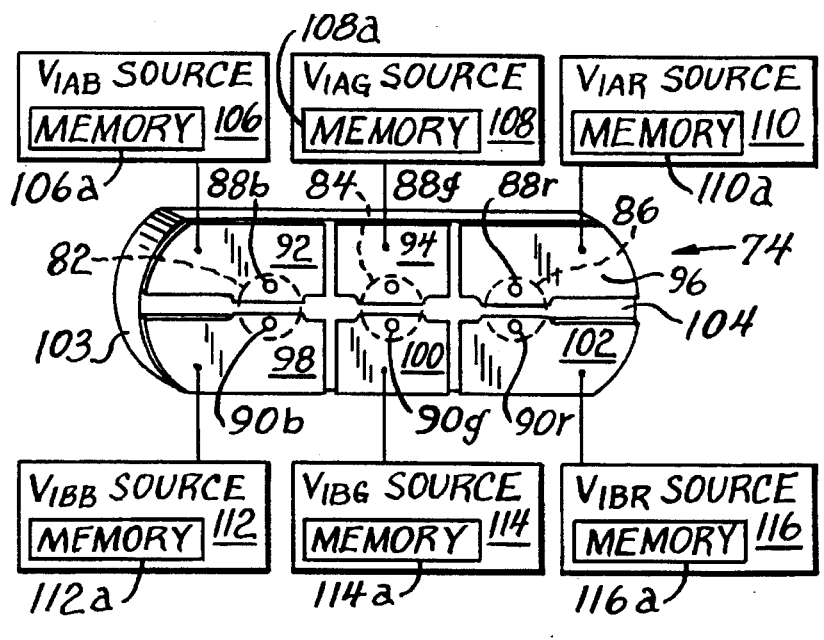
FIG. 7 is an elevation view of the G1 control grid of the electron gun shown in FIG. 4 also illustrating in simplified block diagram form video signal drivers coupled to the G1 control grid in accordance with one embodiment of the present invention.
Figure 8:
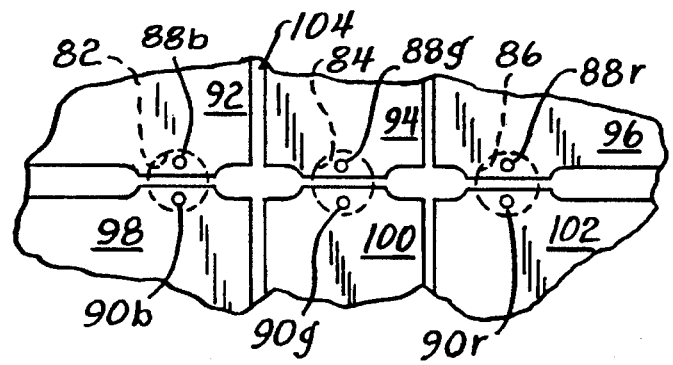
FIG. 8 is an enlarged view of a portion of the G1 control grid illustrated in FIG. 7.

As shown in FIG. 7, each of the aforementioned video signal sources includes a respective memory. Thus, video signal sources $V_{1AB}$, $V_{1AG}$ and $V_{1AR}$ 106, 108 and 110 respectively include video memories 106a, 108a and 110a. Similarly, the $V_{1BB}$, $V_{1BG}$ and $V_{1BR}$ video signal sources 112, 114 and 116 respectively include video memories 112a, 114a and 116a. Each of the aforementioned video memories is adapted for storing video data for subsequently writing the stored video data to its associated video signal source circuit for driving the respective conductive portion to which it is coupled in accordance with the video image to be presented on the display screen 61. Each of the upper electron beams passing through upper apertures 88b, 88g and 88r is swept across an upper horizontal scan line. While each of the three electron beams passing through lower apertures 90b, 90g and 90r is swept across an adjacent, lower horizontal scan line on the display screen. The three upper electron beams and the three lower electron beams thus simultaneously write respective adjacent lines of the color video image on the display screen 61, with the beams passing through apertures 88b and 90b providing the color blue, the beams passing through apertures 88g and 90g providing the color green and the beams passing through apertures 88r and 90r providing the color red. Where electron gun 60 is employed in a color CRT such as in a television receiver, the various aforementioned video memories store data from the received television signal, which data is subsequently read from the memories and provided to a respective one of the conductive portions on the G1 control grid 74. Because of the manner in which the upper and lower trios of electron beams are horizontally displaced across display screen 61 and the vertical spacing between the two electron beams, video data for the upper three electron beams is stored for a longer period in the respective video memories associates with these beams than the period of time corresponding video data is stored in the memories associated with the three lower electron beams. This arrangement allows for simultaneous writing of video image information on adjacent, vertically spaced portions of the display screen.

As shown in FIG. 5, the G2 screen grid 76 is coupled to a $V_{G2}$ voltage source 65 for proper biasing of the electron beams. Similarly, the G3 grid 78 is coupled to a focus voltage ($V_F$) source 67 for focusing the electron beams on the display screen 61, and the G4 grid 80 is coupled to an accelerating voltage ($V_A$) source 69 for accelerating the electrons toward the display screen.

Figure 9:
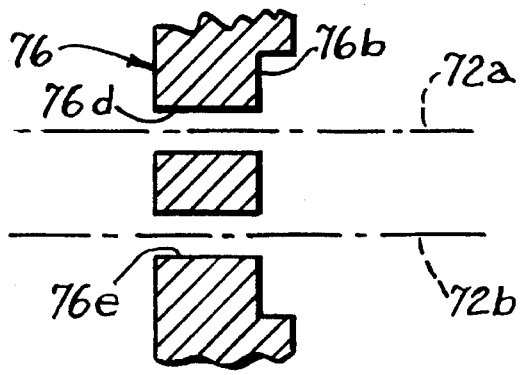
FIG. 9 is a partial sectional view of a portion of the G2 screen grid in the electron gun of FIG. 4 illustrating the passing of two vertically spaced electron beams therethrough.

As described above and as shown in greater detail in FIG. 9 which is a partial vertical sectional view of the G2 screen grid 76, the grid's coined, or recessed, portion 76b includes a pair of spaced, vertically aligned apertures 76d and 76e respectively passing upper and lower electron beams 72a and 72b. The G3 grid 78 includes three spaced, figure eight-shaped apertures 78a, 78b and 78c in facing relation with the G2 screen grid 76 for passing respective pairs of electron beams. The G3 grid 78 further includes three inner, spaced oval apertures 78d, 78e and 78f respectively aligned with apertures 78a, 78b and 78c for passing corresponding pairs of upper and lower electron beams. Finally, the G3 grid 78 includes a horizontally aligned, elongated, chain link-shaped common aperture 78g in facing relation with the G4 grid 80 passing the six electron beams. The G4 grid 80 similarly includes a horizontally aligned, chain link-shaped aperture 80a in facing relation with the G3 grid 78. The G4 grid 80 further includes three inner, spaced, oval apertures 80b, 80c and 80d for passing respective pairs of upper and lower electron beams.

Figure 10:
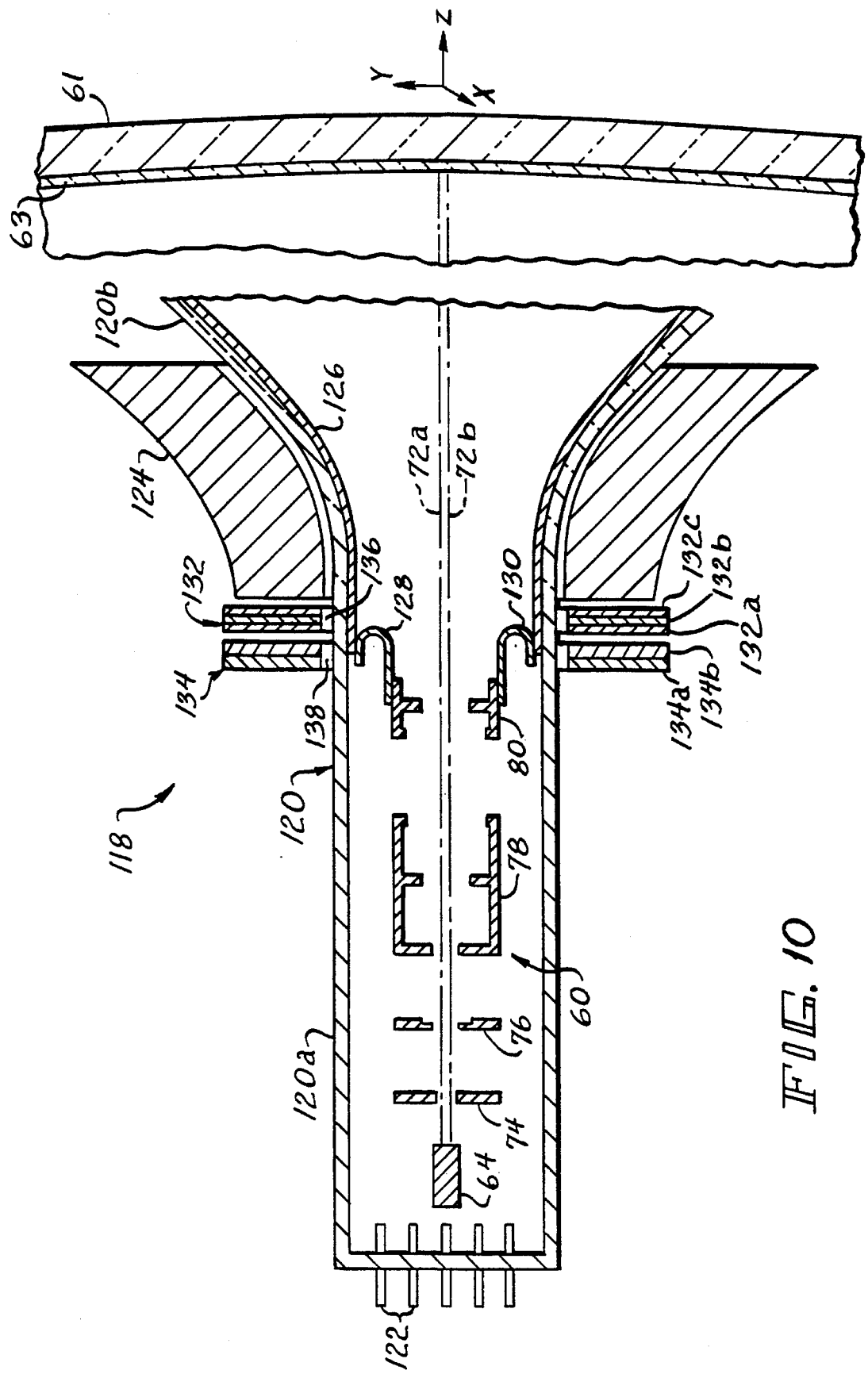
FIG. 10 is a partial vertical sectional view of a color CRT incorporating a multi-beam group electron gun as shown in FIG. 4 in accordance with the present invention.

Referring to FIG. 10, there is shown a partial longitudinal vertical sectional view of the multi-beam group electron gun 60 of FIGS. 4 and 5 in a color CRT 118 in accordance with the present invention. CRT 118 includes a glass envelope 120 having a cylindrical neck portion 120a and a funnel portion 120b of increasing diameter. CRT 118 further includes a plurality of stem pins 122 extending through the end of the neck portion 120a of the CRT's glass envelope 120 to provide various electrical signals to electron gun 60 as well as to other components within the CRT's glass envelope. Also disposed within the CRT's glass envelope 120 on the funnel portion 120b thereof is a conductive film 126 which is coupled to an anode voltage source which is not shown in the figure for simplicity. The G4 grid 80 is coupled to the internal conductive film 126 by means of a plurality of spaced, conductive positioning spacers 128 and 130 for charging the G4 grid to the anode voltage ($V_A$). A magnetic deflection yoke 124 is disposed about the CRT's funnel portion 120b for deflecting the electron beams over the display screen 61 in a raster-like manner. Omitted from FIG. 10, as well as from FIG. 5, is the color CRT's shadow mask which includes a large number of spaced apertures or slots and serves as a color selection electrode to ensure that each of the electron beams is incident upon selected color phosphor elements in the phosphor layer 63 on the inner surface of the display screen 61. The shadow mask is conventional in design and operation and for that reason is not discussed further herein.

As shown in FIG. 10, the two vertically aligned center electron beams 72a and 72b are incident upon the CRT's display screen 61 in a vertically spaced manner. The outer pairs of electron beams are similarly incident upon the display screen 61 in a vertically spaced manner. This permits each of the upper and lower trios of electron beams to trace out a respective, adjacent horizontal scan line during each trace of the display screen 61.

Disposed about CRT 118 generally intermediate electron gun 60 and magnetic deflection yoke 124 are first and second multi-polar magnetic alignment arrangements 132 and 134. The first magnetic alignment arrangement 132 is comprised of a two-pole magnet (or dipole) 132a, a four-pole magnet (or quadrupole) 132b and a six-pole magnet 132c. The second magnetic alignment arrangement 134 includes a four-pole magnet 134a and a six-pole magnet 134b. The operation and configuration of the first and second multi-polar magnetic alignment arrangements 132, 134 in aligning the electron beams in a vertically spaced manner on the display screen 61 is described in detail below with respect to another embodiment of the inventive electron gun including three vertically spaced, grouped electron beams in the electron gun.

Figure 11:
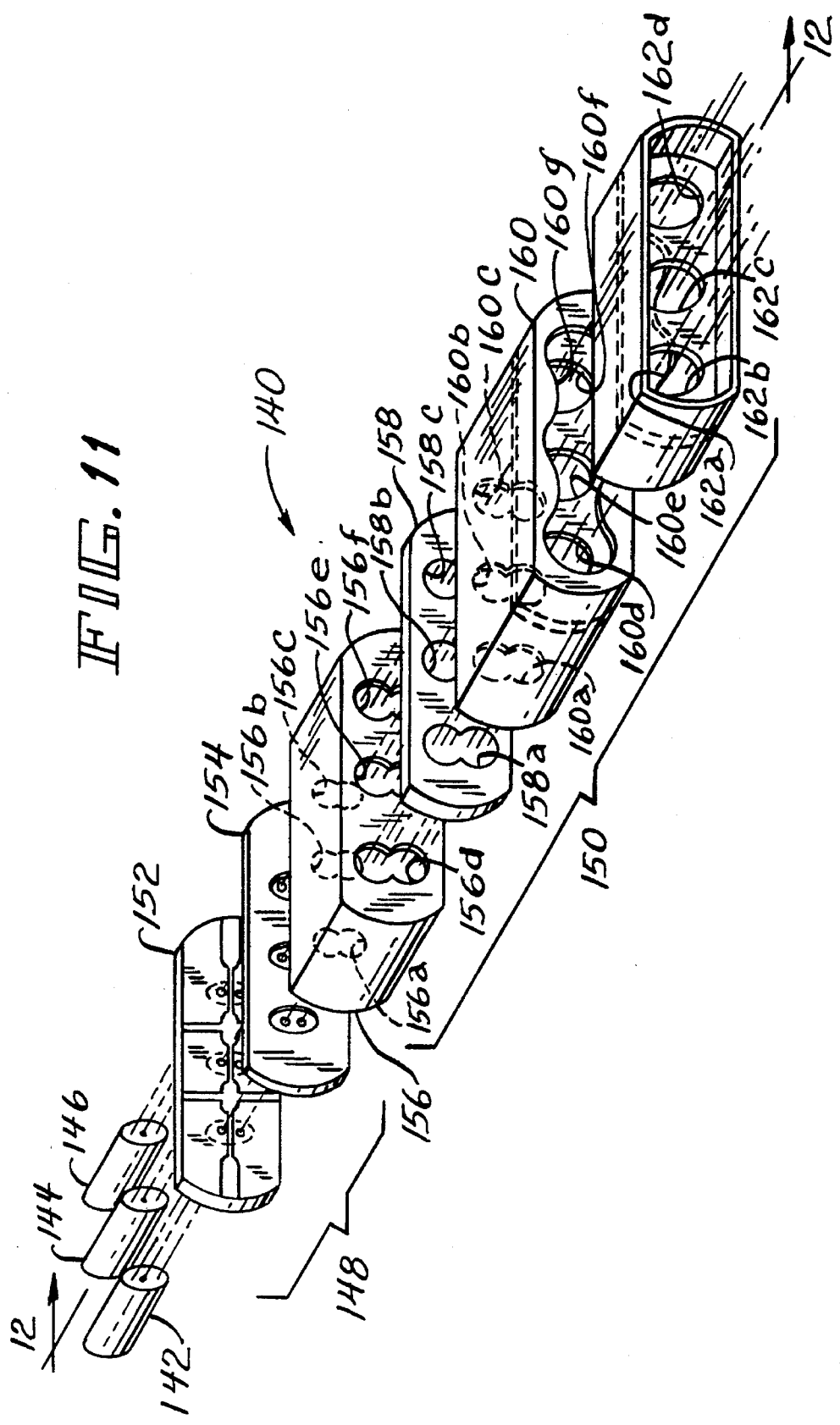
FIG. 11 is a simplified isometric view shown partially in phantom of another embodiment of a multi-beam group electron gun for a color CRT in accordance with the principles of the present invention.
Figure 12:
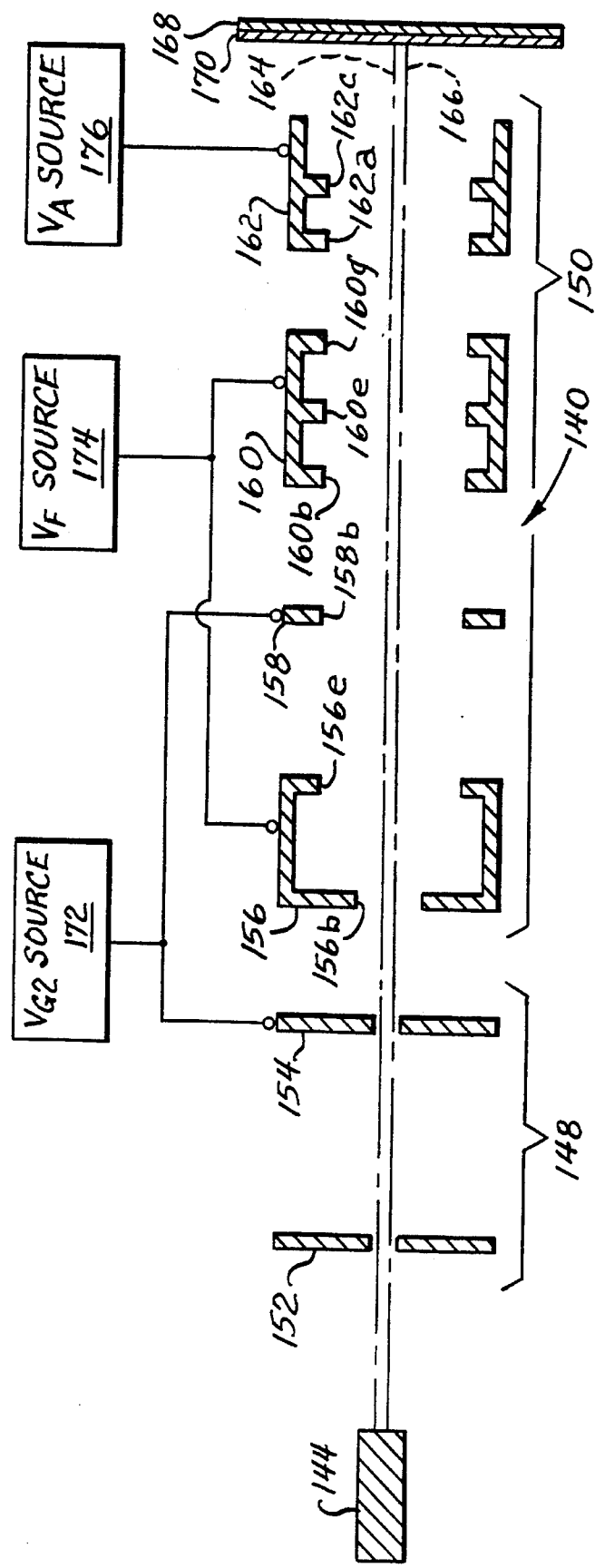
FIG. 12 is a generally vertical, longitudinal sectional view of the electron gun shown in FIG. 11 taken along site line 12—12 therein.

Referring to FIG. 11, there is shown another embodiment of a multi-beam group electron gun 140 for use in a color CRT in accordance with the present invention. FIG. 12 is a longitudinal vertical sectional view of the multi-beam group electron gun 140 shown in FIG. 11 taken along site line 12—12 therein. Electron gun 140 includes three inline cathodes 142, 144 and 146 for providing energetic electrons. Disposed adjacent to cathodes 142, 144 and 146 is a beam forming region (BFR) 148 which includes the combination of a G1 control grid 152 and a G2 screen grid 154. Electron gun 140 further includes a high voltage focusing lens 150 disposed intermediate BFR 148 and the CRT's display screen 168 as shown in the sectional view of FIG. 12. The high voltage focusing lens 150 includes a G3 grid 156, a G4 grid 158, a G5 grid 160 and a G6 grid 162. The G2 and G4 grids 154, 158 are coupled to a $V_{G2}$ voltage source 172, while the G3 and G5 grids 156, 160 are coupled to a focus voltage ($V_F$) source 174. The G6 grid 162 is coupled to an accelerating voltage ($V_A$) source 176. Electron gun 140 is thus of the quadrupole type.

As in the previously described embodiment, the G1 control grid 152 and the G2 screen grid 154 each include three pairs of vertically aligned apertures for forming six electron beams. Each of the electron beams passing through a pair of vertically aligned apertures provides one of the primary colors of red, green or blue on the CRT's display screen 168. A phosphor layer 170 is disposed on the inner surface of display screen 168. Three horizontally aligned electron beams are converged to a common spot on the CRT's display screen 168 and are displaced in unison along a common horizontal scan line with each sweep of the display screen. This permits the upper trio of electron beams to form a first, upper portion of the video image on a first horizontal scan line and the lower trio of electron beams to form a second, lower portion of the video image on an adjacent, lower horizontal scan line.

The G3 grid 156 includes a first trio of figure eight-shaped apertures 156a, 156b and 156c in facing relation with the G2 screen grid 154. The G3 further includes a second trio of larger figure eight-shaped apertures 156d, 156e and 156f in facing relation with the G4 grid 158. The enlarged upper and lower portions of each figure eight-shaped aperture is adapted to pass a respective electron beam, with apertures 156a and 156d, apertures 156b and 156e, and apertures 156c and 156f in common alignment to pass respective pairs of vertically spaced electron beams. The G4 grid 158 similarly includes three spaced figure eight-shaped apertures 158a, 158b and 158c, each adapted to pass a respective pair of vertically aligned electron beams. The G5 grid 160 includes three inline figure eight-shaped apertures 160a, 160b and 160c in facing relation with the G4 grid 158. The G5 grid 160 further includes three inline oval apertures 160d, 160e and 160f which are respectively aligned with apertures 160a, 160b and 160c for passing respective pairs of vertically aligned apertures. The G5 grid 160 further includes a horizontally aligned, elongated, chain link-shaped common aperture 160g in facing relation with the G6 grid 162 for passing all six electron beams. The G6 grid 162 similarly includes a horizontally aligned, chain link-shaped common aperture 162a as well as three inline oval apertures 162b, 162c and 162d. Common aperture 162a passes all six electron beams, while each of the oval shaped apertures 162b, 162c and 162d pass respective pairs of vertically aligned electron beams. The sectional view of FIG. 12 shows the two center electron beams 164 and 166 incident upon the CRT's display screen 168 in a vertically spaced manner so as to trace out adjacent horizontal scan lines when deflected across the screen.

Figure 13:
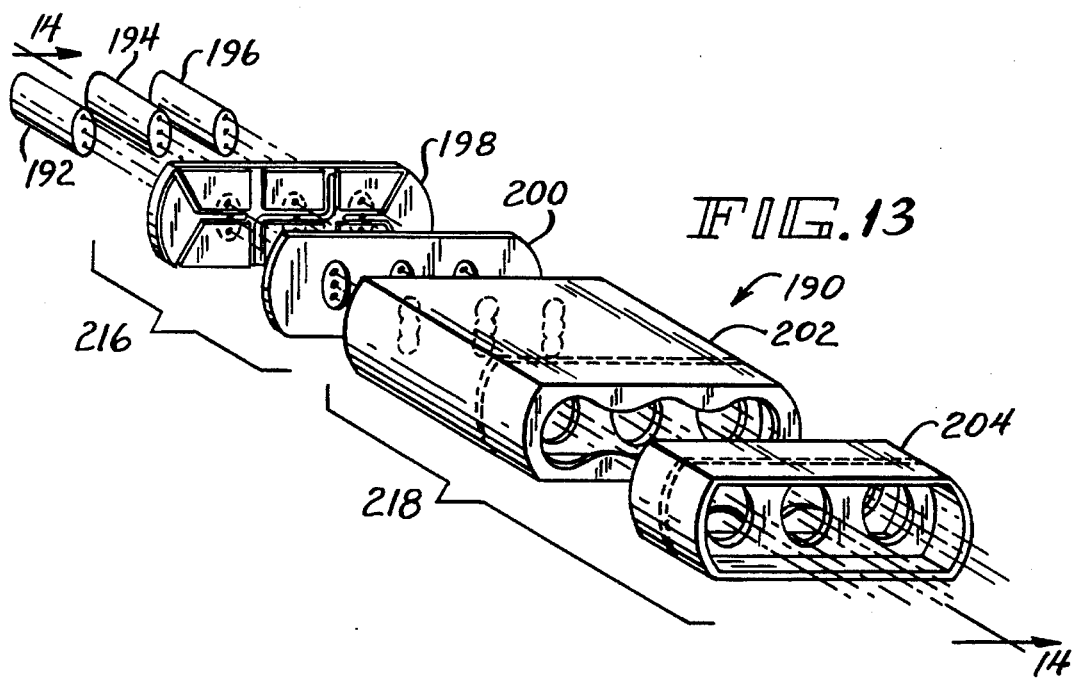
FIG. 13 is a simplified isometric view shown partially in phantom of yet another embodiment of a multi-beam group electron gun for a color CRT in accordance with the principles of the present invention.
Figure 14:
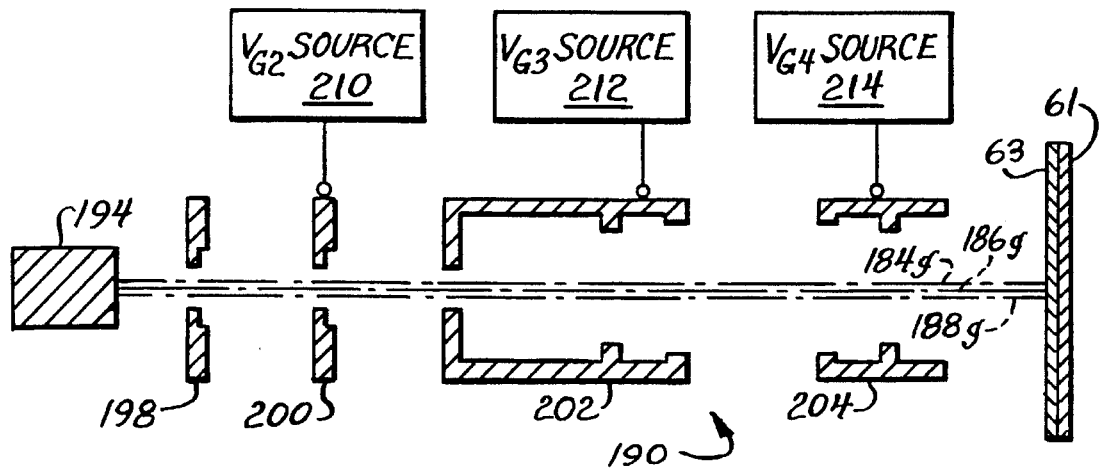
FIG. 14 is a generally vertical, longitudinal sectional view of the electron gun shown in FIG. 13 taken along site line 14—14 therein.

Referring to FIG. 13, there is shown partially in phantom an isometric view of another embodiment of a multi-beam group electron gun 190 for a color CRT in accordance with the principles of the present invention. FIG. 14 is a longitudinal vertical sectional view of the multi-beam group electron gun 190 shown in FIG. 13 taken along site line 14—14 therein. As in the case of the previously described electron gun 50 shown in FIG. 4, electron gun 190 shown in FIGS. 13 and 14 is of the bi-potential type. However, rather than having groups of only two vertically spaced electron beams for each of the primary colors, electron gun 190 directs three vertically aligned, spaced electron beams onto the CRT's display screen 61 for each of the primary colors of red, green and blue.

Electron gun 190 includes three inline cathodes 192, 194 and 196 for directing respective pluralities of energetic electrons toward a G1 control grid 198. The G1 control grid 198 in combination with a G2 screen grid 200 comprises a BFR 216 for forming the energetic electrons into nine beams, where the center, vertically aligned electron beams are shown as elements 184g, 186g and 188g in FIG. 14. Electron gun 190 further includes a G3 grid 202 and a G4 grid 204, which combination comprises a high voltage focus lens 218 for accelerating the electrons toward and focusing the electron beams on the CRT's display screen 61. The G2 screen grid 200 is coupled to a $V_{G2}$ voltage source 210, while the G3 and G4 grids 202, 204 are respectively coupled to a $V_{G3}$ source 212 and a $V_{G4}$ source 214. The G1 control grid 198 is coupled to a plurality of video signal sources as described in detail below.

Figure 15:
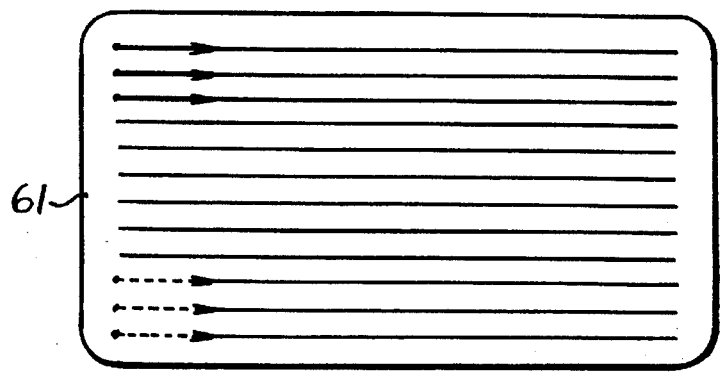
FIG. 15 is a simplified elevation view of a CRT display screen illustrating the manner in which a plurality of vertically spaced, vertically aligned electron beams of the electron gun of FIG. 13 scan the display screen in forming a color image thereon in accordance with another embodiment of the present invention.

In accordance with this embodiment of the invention, each of the three horizontally aligned upper, intermediate and lower trio of electron beams are focused on respective common spots on the display screen 61 as shown in the elevation view of the display screen in FIG. 15. As shown in the upper left-hand corner of the display screen 61, the three vertically aligned spots formed by converged horizontally aligned primary color electron beams are displaced rightward in the direction of the arrows along respective horizontal scan lines on the display screen by means of the CRT's magnetic deflection yoke (not shown). The nine electron beams forming three vertically aligned spots on the display screen 61 are displaced in a raster-like manner until the three bottom horizontal scan lines are traced as shown in dotted-line form in the lower left-hand portion of the display screen 61 of FIG. 15. Following the tracing by the electron beams of the bottom horizontal scan lines, the beams are deflected upward and to the left so as to re-initiate tracing of the uppermost horizontal scan lines. The simultaneous presentation of different video image information on three adjacent horizontal scan lines permits the beam scan frequency to be reduced while maintaining the same frame trace time for each complete scan of the video image on the display screen 61. With a reduction in the horizontal scan frequency, electron beam dwell time on the display screen is correspondingly increased allowing for a reduction in individual beam electron density while maintaining small beam spot size and high video image resolution and brightness because of a corresponding increase in beam dwell time.

Figure 19:
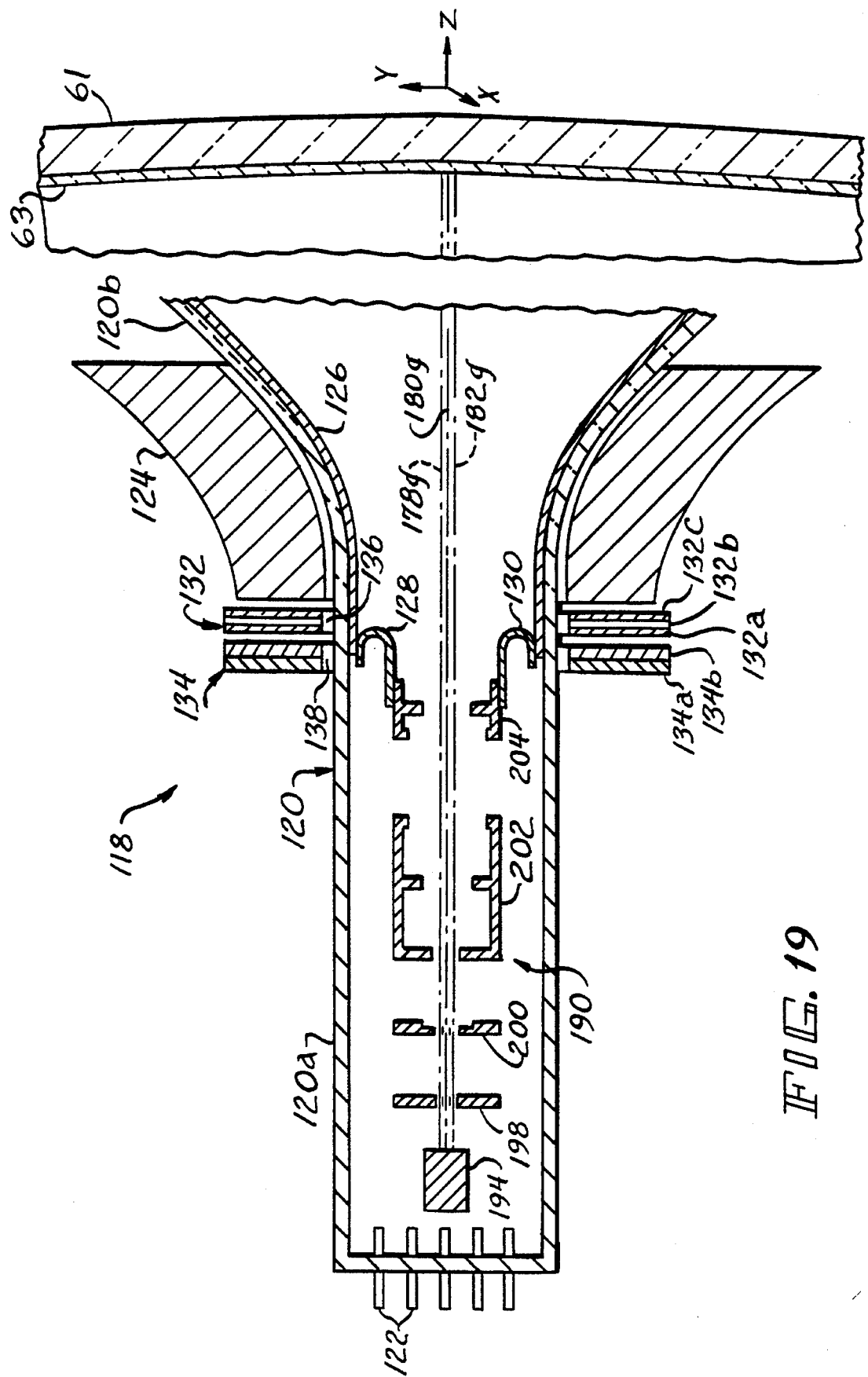
FIG. 19 is a partial vertical sectional view of a color CRT incorporating a multi-beam group electron gun as shown in FIG. 13 in accordance with the present invention.
Figure 20:
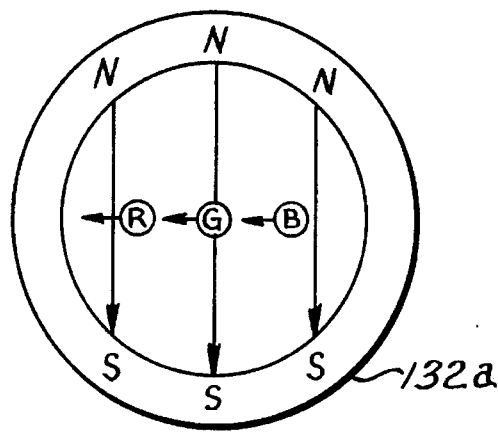
FIG. 20 is a simplified schematic diagram of a two-pole magnet used in the magnetic convergence arrangement of the CRT shown in FIG. 19 for aligning the six electron beams.
Figure 21A:
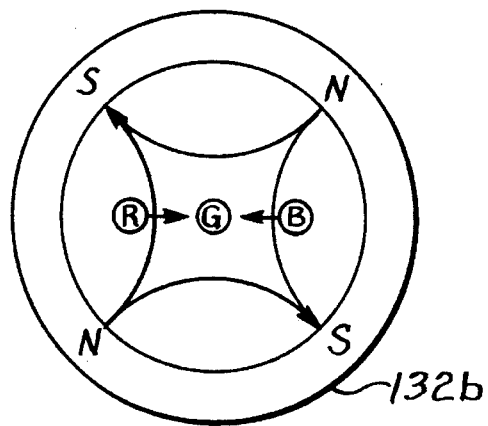
FIGS. 21a and 21b are simplified schematic diagrams of a four-pole magnet in the magnetic convergence arrangement of the CRT shown in FIG. 19 for aligning the six electron beams.
Figure 21B:
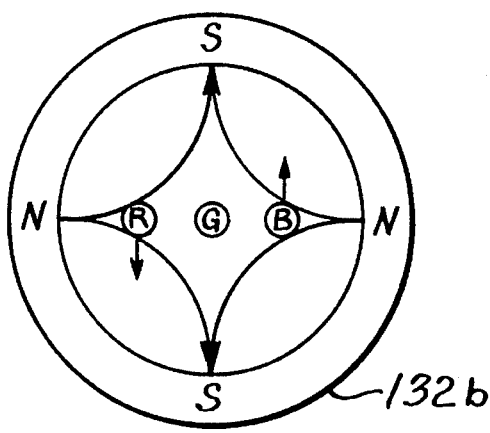
Figure 22A:
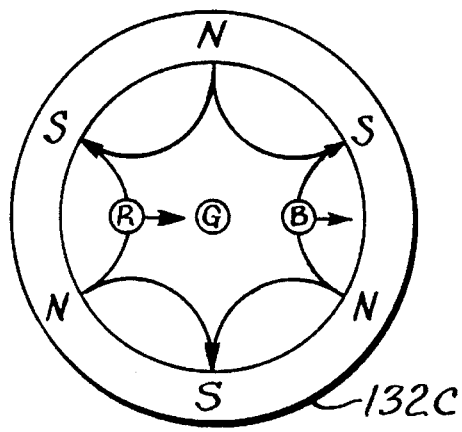
FIGS. 22a and 22b are simplified schematic diagrams of a six-pole magnet in the magnetic convergence arrangement in the CRT shown in FIG. 19 for aligning the six electron beams.
Figure 22B:
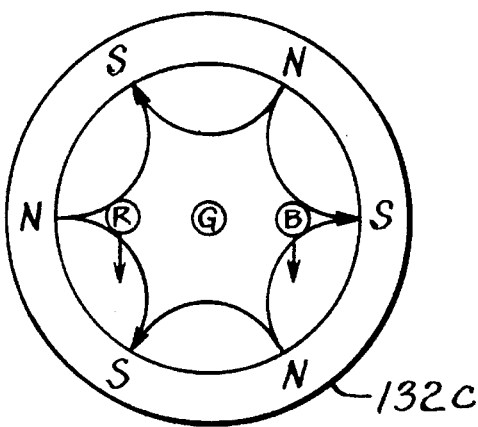

Referring to FIG. 19, there is shown a partial sectional view of a color CRT 118 incorporating multi-beam group electron gun 190 in accordance with the present invention. CRT 118 includes a glass envelope 120 with a cylindrical neck portion 120a and a funnel portion 120b of increasing diameter. CRT 118 further includes a plurality of stem pins 122 extending through the end of the neck portion 120a of the CRT. Also disposed within the CRT glass envelope 120 on the funnel portion 120b thereof is a conductive film 126 which is coupled to an anode voltage source (not shown). The G4 grid 204 is coupled to the internal conductive film 126 by means of a plurality of spaced, conductive positioning spacers 128 and 130 for charging the G4 grid to the anode voltage ($V_A$). A magnetic deflection yoke 124 is disposed about the CRT's funnel portion 120b for deflecting the electron beams over the display screen 61 in a raster-like manner.

As shown in the sectional view of FIG. 12, the three center vertically aligned electron beams 178g, 180g and 182g are incident upon the CRT's display screen 61 in a vertically spaced manner. This permits each of the three electron beams, as well as the two outer beams associated with each of these center beams, to trace out a respective, adjacent horizontal scan line during each scan of the display screen 61.

Disposed about CRT 118 generally intermediate the electron gun 190 and magnetic deflection yoke 124 are first and second multi-polar magnetic alignment arrangements 132 and 134. The first magnetic alignment arrangement 132 is comprised of a two-pole magnet (or dipole) 132a, a four-pole magnet (or quadrupole) 132b, and a six-pole magnet 132c. The second multi-polar magnetic alignment arrangement 134 is comprised of a four-pole magnet 134a and a six-pole magnet 134b. Each of the aforementioned magnets includes two closely spaced magnetic pole pieces each in the form of a ring shaped, flat disc, although only one such flat disc is shown for each magnet arrangement in the figures for simplicity. The first multi-polar magnetic alignment arrangement 132 is disposed on a first rotating mount 136, while each of the magnets of the second multi-polar magnetic alignment arrangement 134 is disposed on a second rotating mount 138. The first and second rotating mounts 136, 138 permit the magnets attached thereto to be rotationally displaced about the CRT's envelope 120 and for the magnetic pole pieces in each magnet to be rotationally displaced relative to one another for adjusting magnetic field strength for aligning the electron beams as described below. Each magnet further includes a tap arrangement for quickly and conveniently increasing or decreasing the field strength of the dipole, quadrupole and six-pole magnets in a production line. Such arrangements for adjusting magnetic field strength in a CRT for aligning electron beams are well known to those skilled in the art and are not further described herein.

Referring to FIGS. 20, 21a and 21b, and 22a and 22b, there are respectively shown elevation views of the two-pole magnet 132a, the four-pole magnet 132b, and the six-pole magnet 132c. The longer arrows within the magnets represent the magnetic field lines, while the shorter arrows represent the force exerted by the magnet on a beam of electrons directed through the magnet. The magnets 132a, 132b and 132c may be used in a conventional manner well known to those skilled in the art to maintain the various electron beams in proper alignment. In aligning the electron beams, two horizontal rows of electron beams are turned off and the third row of beams is aligned using the magnets of the first magnetic alignment arrangement 132. This alignment procedure is sequentially performed for each of the three horizontal rows of electron beams separately. Once the beams in each horizontal row of electron beams are aligned, vertical spacing between adjacent rows of electron beams is provided for by means of the magnets of the second magnetic alignment arrangement 134.

Figures 16, 17, 18:
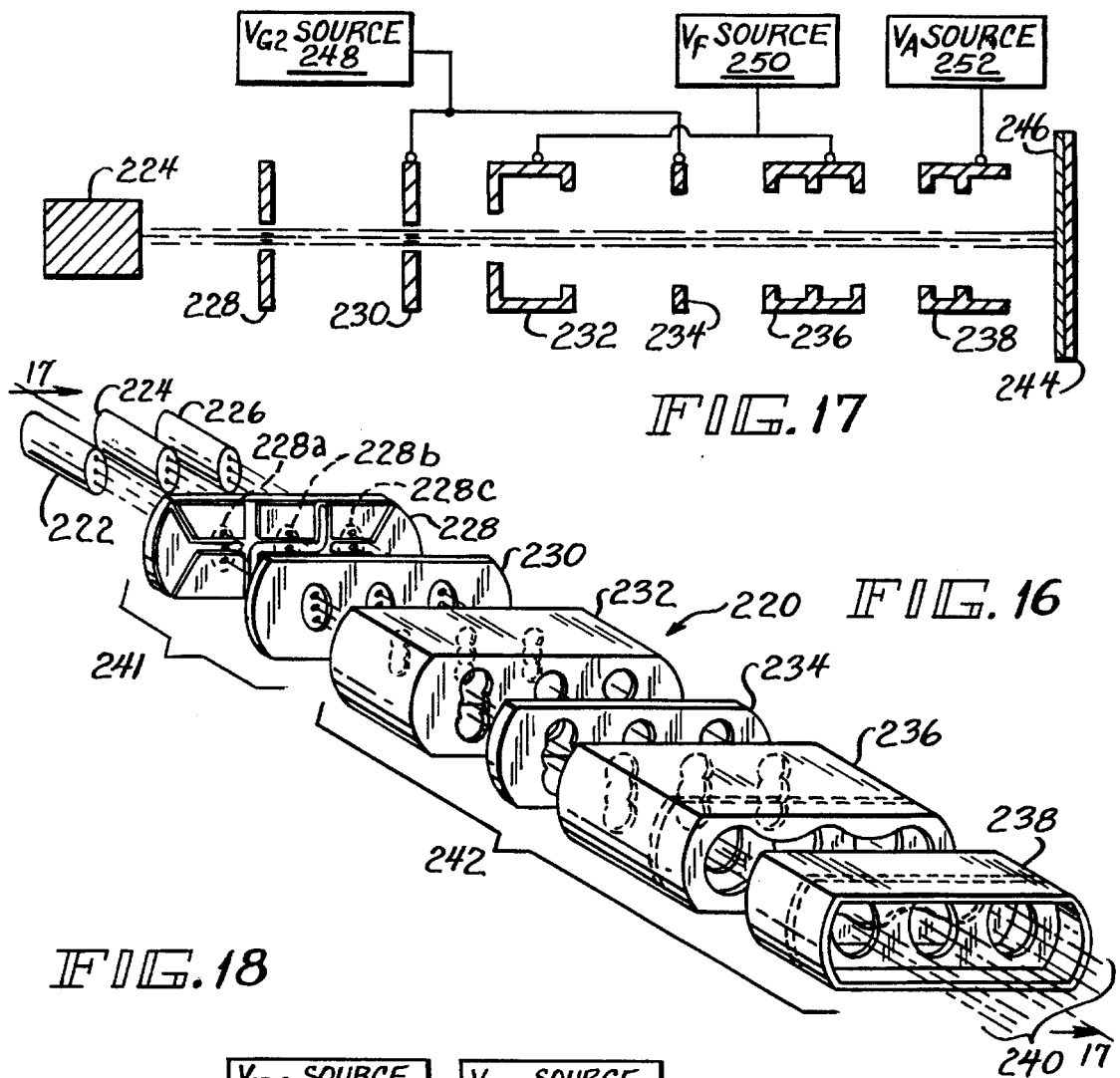
FIG. 16 is a simplified isometric view shown partially in phantom of a multi-beam group electron gun for a color CRT in accordance with yet another embodiment of the present invention.
FIG. 17 is a generally vertical, longitudinal sectional view of the electron gun shown in FIG. 16 taken along site line 17—17 therein.
FIG. 18 is an elevation view of the G1 control grid of the electron gun shown in FIG. 16 also illustrating in simplified block diagram form video signal drivers coupled to the G1 control grid.

Referring to FIG. 16, there is shown another embodiment of a multi-beam group electron gun 220 of the quadrupole type in accordance with the another embodiment of the present invention. A longitudinal sectional view of the multi-beam group electron gun 220 of FIG. 16 taken along site line 17—17 therein is shown in FIG. 17. Electron gun 220 includes three spaced, inline cathodes 222, 224 and 226 for directing energetic electrons toward a G1 control grid 228. The G1 control grid 228 in combination with a G2 screen grid 230 comprises a BFR 241 for forming the energetic electrons into nine electron beams 240 (shown in dotted-line form) comprised of three spaced groups of three vertically aligned electron beams. The G1 control and G2 screen grids 228, 230 thus each include nine apertures with respective pairs of apertures in the two grids aligned so as to pass the nine electron beams. Electron gun 220 further includes a high voltage focusing lens 242 comprised of a G3 grid 232, a G4 grid 234, a G5 grid 236, and a G6 grid 238 for accelerating the electrons toward and focusing the electron beams on a CRT display screen 244 having an inner phosphor coating 246. The G2 screen grid 230 and the G4 grid 234 are coupled to a voltage source 248, while the G3 grid 232 and the G5 grid 236 are coupled to a focus voltage ($V_F$) source 250. The G6 grid 238 is coupled to an accelerating voltage ($V_A$) source 252.

Referring to FIG. 18, there is shown an elevation view of the G1 control grid 228 in accordance with the present invention. The G1 control grid 228 and the various video signal connections thereto for electron gun 220 is essentially identical to the G1 control grid 198 and connections thereto in electron gun 190 previously described. The surface of the G1 control grid 228 facing the three cathodes 222, 224 and 226 includes three spaced coined, or recessed portions 228a, 228b and 228c shown in dotted-line form. Disposed within the first coined portion 228a are three vertically aligned apertures 280b, 282b and 284b as shown in FIG. 18. Similarly, the center coined portion 228b includes three vertically aligned apertures 280g, 282g and 284g. Finally, the third coined portion 228c includes vertically aligned apertures 280r, 282r and 284r. The first three vertically aligned apertures pass electron beams which provide the color blue, while the second and third groups of vertically aligned apertures respectively pass electron beams which provide the colors green and red.

The G1 control grid 228 is comprised of a non-conductive ceramic substrate 260 having on its surface facing the G2 screen grid 230 a plurality of thin conductive elements each encompassing a respective one of the beam-passing apertures. Each of these conductive elements is coupled to a respective video signal source for modulating the electron beam passing through its associated aperture. Thus, the upper row of beam-passing apertures 280b, 280g and 280r are respectively disposed in conductive portions 262, 264 and 266 on the surface of ceramic substrate 260. Similarly, each of the lower row of apertures 284b, 284g and 284r is disposed within a respective one of the conductive portions 269, 271 and 273. Finally, the middle row of beam-passing apertures 282b, 282g and 282r are respectively disposed in conductive portions 275, 277 and 279. The conductive portions are formed by attaching a thin metallic layer to the surface of the ceramic substrate 260 such as by brazing or cramping. Portions of the thus attached metal layer are then removed by conventional means such as chemical etching so as to form the separated, discrete conductive portions shown in the figure. An insulating gap is thus formed between adjacent pairs of conductive portions so as to electrically isolate the conductive portions from one another. Each of the aforementioned conductive portions has essentially the same surface area so as to provide each conductive portion with essentially the same capacitance.

As shown in FIG. 18, each of the aforementioned conductive portions is coupled to and driven by a respective video signal source. Thus, the upper row of conductive portions 262, 264 and 266 are respectively coupled to $V_{1AB}$, $V_{1AG}$ and $V_{1AR}$ video signal sources 286, 288 and 290. Similarly, each of the conductive portions 269, 271 and 273 in the lower row is coupled to a respective one of the $V_{1CB}$, $V_{1CG}$ and $V_{1CR}$ video signal sources 298, 300 and 302. Finally, each of the intermediate, or center, conductive portions 275, 277 and 279 is coupled to a respective one of the video signal sources $V_{1BB}$, $V_{1BG}$ and $V_{1BR}$ video signal sources 292, 294 and 296. With each of the beam-passing apertures disposed within and extending through a respective one of the conductive portions, variations in the video signals provided to each of the conductive portions allows an electron beam passing through each respective aperture to be modulated in accordance with the video image to be presented on the display screen. In this manner, the embodiment of the G1 control grid 228 shown in FIG. 18 permits nine electron beams to be modulated in accordance with nine separate video signals.

Each of the aforementioned video signal sources includes a respective video memory. Thus, the $V_{1AB}$, $V_{1AG}$ and $V_{1AR}$ video signal sources 286, 288 and 290 respectively include video memories 286a, 288a and 290a. Similarly, the $V_{1BB}$, $V_{1BG}$ and $V_{1BR}$ video signal sources 292, 294 and 296 respectively include video memories 292a, 294a and 296a. Finally, the $V_{1CB}$, $V_{1CG}$ and $V_{1CR}$ video signal sources 298, 300 and 302 respectively include video memories 298a, 300a and 302a. Each of the video memories is adapted for storing video image data for subsequent writing to a respective one of the G1 grid's conductive portions for controlling a respective one of the electron beams passing through an aperture therein. Temporary storage of data in the video memories allows the data to be read from the memories and provided to the G1 grid's conductive portions such that the upper three electron beams, the intermediate three electron beams, and the lower three electron beams contain video data for adjacent scan lines forming an image on the display screen. For example, video information in a received television signal for the three upper electron beams would be stored in memory longer than the video data provided to the two lower rows of electron beams would be stored in corresponding memories because of all of the electron beams simultaneously trace out a portion of a video image, with the data for the upper three beams received earlier.

Figure 23:
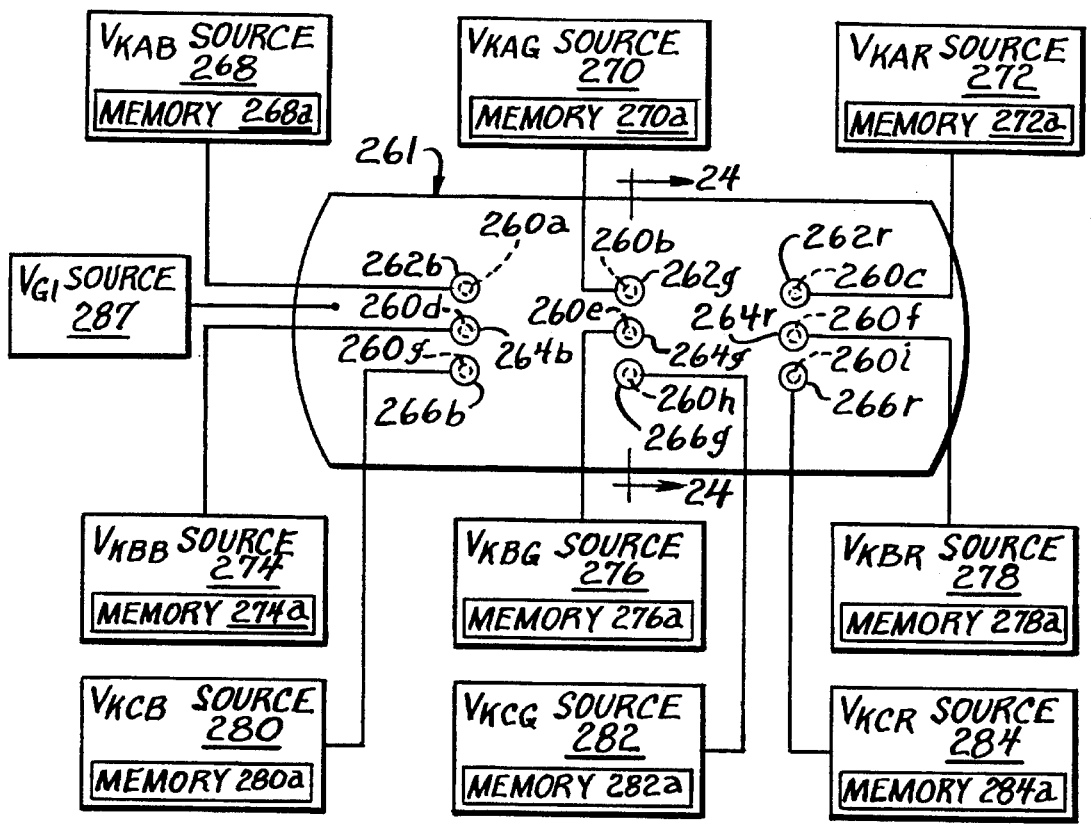
FIG. 23 is an aft elevation view of another embodiment of a plurality of cathodes and G1 control grid combination for use in the present invention showing each of the cathodes coupled to a respective video signal source.
Figure 24:
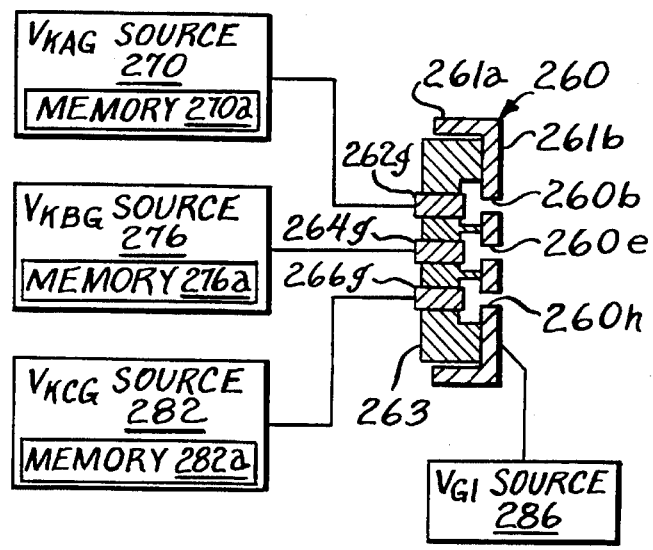
FIG. 24 is a lateral sectional view of the cathode and G1 control grid combination shown in FIG. 22 taken along site line 24—24 therein.

Referring to FIG. 23, there is shown an aft elevation view of another embodiment of a G1 control grid 261 for use in the present invention. A lateral sectional view of the G1 control grid 261 shown in FIG. 23 taken along site line 24—24 therein is shown in FIG. 24. The G1 control grid 261 includes a 3×3 matrix of apertures shown in dotted-line form including an upper row of apertures 260a, 260b and 260c; a middle row of apertures 260d, 260e and 260f; and a lower row of apertures 260g, 260h and 260i. Disposed aft of and adjacent to each of the aforementioned apertures is a respective cathode. Thus, an upper row of cathodes 262b, 262g and 262r are respectively disposed aft of and adjacent to apertures 260a, 260b and 260c. Similarly, a middle row of cathodes 264b, 264g and 264r are respectively disposed immediately aft of apertures 260d, 260e and 260f. Finally, a lower row of cathodes 266b, 266g and 266r are respectively disposed immediately aft of apertures 260g, 260h and 260i. The G1 control grid 261 includes a generally flat end wall 261b containing the matrix of apertures and a side wall 261a extending about the periphery of the end wall. Disposed within the end wall 261b and including a plurality of spaced apertures for receiving and supporting each of the cathodes is an insulating ceramic substrate 263. The G1 control grid 261 is preferably comprised of a conductive metal and is biased by a $V_{G1}$ voltage source 286. Each of the cathodes when heated generates a respective plurality of energetic electrons which are directed through an adjacent aperture in the G1 control grid 261. In this manner, nine spaced electron beams arranged in a 3×3 matrix are formed by the G1 control grid 261 and are directed toward a G2 screen grid in the electron gun which is not shown in the figures for simplicity.

Each of the cathodes is coupled to and energized by a respective video signal source. Thus, each of the upper row cathodes 262b, 262g and 262r is respectively coupled to the $V_{KAB}$, $V_{KAG}$ and $V_{KAR}$ video signal sources 268, 270 and 272. Similarly, each of the middle row cathodes 264b, 264g and 264r is respectively coupled to the $V_{KBB}$, $V_{KBG}$ and $V_{KBR}$ video signal sources 274, 276 and 278. Finally, each of the lower row cathodes 266b, 266g and 266r is respectively coupled to the $V_{KCB}$, $V_{KCG}$ and $V_{KCR}$ video signal sources 280, 282 and 284. Each of the video signal sources provides a modulating signal to its associated cathode for controlling the electrons emitted by the cathode and the resulting video image formed by the electron beam. Each of the video signal sources includes a respective memory for storing video data which is read from the video memory and provided to an associated cathode. Thus, the $V_{KAB}$, $V_{KAG}$ and $V_{KAR}$ video signal sources 268, 270 and 272 respectively include video memories 268a, 270a and 272a. Video signal sources $V_{KBB}$, $V_{KBG}$ and $V_{KBR}$ 274, 276 and 278 respectively include video memories 274a, 276a and 278a. Finally, video signal sources $V_{KCB}$, $V_{KCG}$ and $V_{KCR}$ 280, 282 and 284 respectively include video memories 280a, 282a and 284a. Video memories allow the video signal sources associated with different horizontal scan lines to temporarily store video data, such as in a received television signal, for subsequent recall and simultaneous display with video data associated with adjacent horizontal scan lines.

Referring to FIGS. 25 and 26, there are respectively shown elevation views of a G2 screen grid 310 and a G1 control grid 323 for use in an electron gun in accordance with yet another embodiment of the present invention. The G1 control grid 323 and the G2 screen grid 310 are both in the general form of flat plates, having three pairs of vertically aligned apertures for passing six electron beams which are not shown in the figures for simplicity. The G1 control grid 323 is comprised of a non-conductive ceramic substrate having first, second, and third coined, or recessed portions 344, 346, and 348 in facing relation to the electron gun's cathodes, which also are not shown in the figure for simplicity. Disposed within the first coined portion 344 are a pair of vertically aligned apertures 338b and 340b. Similarly, respectively disposed within the second and third coined portions 346 and 348 and extending through the ceramic substrate of the G1 control grid 323, are second and third pairs of vertically aligned apertures 338g, 340g, and 338r, 340r. Apertures 338b and 340b pass a pair of blue electron beams; apertures 338g and 340g pass green electron beams; apertures 338g and 340g pass green electron beams; and apertures 338r and 340r pass red electron beams. Thus, the trio of upper apertures 338b, 338g, and 338r pass three electron beams for generating the primary colors, while the lower trio of apertures 340b, 340g, and 340r similarly pass three electron beams which form the primary colors on the display screen.

The G1 control grid 323 further includes six thin conductive portions 324, 326, 328, 330, 332, and 334 disposed on its surface facing the G2 screen grid 310. The conductive portions are formed on the G1 control grid's ceramic substrate by affixing a thin, conductive, metallic layer on the surface of the ceramic substrate, such as by brazing or cramping. A portion of the conductive layer is then removed in a conventional manner such as by chemical etching so as to form a continuous non-conductive insulating gap 336, separating the various conductive portions. Insulating gap 336 exposes the underlying ceramic substrate and defines the six aforementioned conductive portions 324, 326, 328, 330, 332, and 334. Each of these conductive portions encloses a respective one of the G1 control grid's beam-passing apertures 338b, 338g, 338r, 340b, 340g, and 340r, allowing each of the electron beams to be individually modulated by a respective video signal provided to each of the conductive portions as previously described.

With reference specifically to FIG. 25, the G2 screen grid 310 is also shown as including first, second, and third horizontally aligned coined, or recessed, portions 318, 320, and 322. Each of the first, second and third coined portions 318, 320, and 322 is in facing relation to a G3 grid in the electron gun, which is not shown for simplicity. First coined portion 318 includes first and second vertically aligned beam-passing apertures 312b and 314b. Similarly, the second and third coined portions 320 and 322 respectively include first and second pairs of vertically aligned beam-passing apertures 312g, 314g, and 312r, 314r. Apertures 312b and 314b are respectively aligned with apertures 338b and 340b in the G1 control grid 323 for passing a pair of blue electron beams. Apertures 312g and 314g are respectively aligned with apertures 338g and 340g in the G1 control grid 323 for passing green electron beams. Finally, apertures 312r and 314r are respectively aligned with apertures 338r and 340r in the G1 control grid 323 for passing red electron beams.

In accordance with this aspect of the present invention, the horizontal separation between adjacent vertically aligned beam-passing apertures is given by the distance $S_H$. Thus, the horizontal spacing between vertically aligned apertures 312b, 314b and apertures 312g, 314g is $S_H$. Similarly, the horizontal distance between apertures 312g, 314g and apertures 312r, 314r is $S_H$. The vertical separation between adjacent vertically aligned apertures is given by the distance $S_V$. Thus, the vertical distance between apertures 312b and 314b, between apertures 312g and 314g, and between apertures 312r and 314r is $S_V$. Similar vertical and horizontal separation distances are provided for between the adjacent beam-passing apertures in the G1 control grid 323, as shown in FIG. 26. As shown in FIGS. 25 and 26, the horizontal separation between the two outer pairs of vertically aligned apertures 312b, 314b, and 312r, 314r in the G2 screen grid 310 and apertures 338b, 340b and 338r, 340r in the G1 control grid 323 is given by the distance $2S_H$. In a preferred embodiment of the G1 control grid 323 and G2 screen grid 310, $S_V$ is between 1/20 and 1/2 $S_H$, or $$1/20\ S_H \leq S_V \leq 1/2\ S_H.$$

where $S_H$=the beam-to-beam center line spacing along the horizontal direction and $S_V$=the beam-to-beam center line spacing along the vertical direction.

Referring to FIG. 27 and FIG. 28, there are respectively shown elevation views of a G2 screen grid 354 and a G1 control grid 380 for use in an electron gun in accordance with yet another embodiment of the present invention. The G2 screen grid 354 includes first, second, and third horizontally aligned coined portions 362, 364, and 366. Disposed within the first coined portion 362 are three vertically aligned beam-passing apertures 356b, 358b, and 360b. Similarly, disposed within the second and third coined portions of 364 and 366, are vertically aligned apertures of 356g, 358g, 360g, and 356r, 358r, and 360r, respectively. The horizontal spacing between the three center vertically aligned apertures 356g, 358g, and 360g and the two sets of outer vertically aligned apertures is given by the distance $S_H$.

The horizontal distance between vertically aligned apertures 356b, 358b and 360b and vertically aligned apertures 356r, 358r, and 360r is given by the distance $2S_H$. Within each coined portion, the vertical spacing between adjacent beam-passing apertures is given by the distance $S_V$. The vertical spacing between the upper and lower beam-passing apertures within each of the three coined portions is given by the distance $2S_V$.

In FIG. 28, the G1 control grid 380 is shown as comprised of a non-conductive ceramic substrate 381 having on its surface facing the G2 screen grid a plurality of thin, conductive elements 382, 384, 386, 388, 390, 392, 394, 396, and 398, each encompassing a respective beam-passing aperture. The beam-passing apertures are arranged in a matrix array and include three horizontally inline groups of vertically aligned apertures including first, second, and third trios of apertures 406b, 408b, 410b; 406g, 408g, 410g; and 406r, 408r, 410r. Each of the conductive elements is coupled to a respective video signal for modulating the electron beam-passing through its associated aperture as previously described. Thus, the upper row of beam-passing apertures 406b, 406g, and 406r is disposed within a respective one of the conductive portions of 382, 384 and 386. Similarly, each of the lower row of beam apertures 410b, 410g and 410r are respectively disposed with conductive portions 394, 396 and 398. Finally, the middle row of beam-passing apertures, 408b, 408g, and 408r are respectively disposed within conductive portions 388, 390, and 392. Each of the aforementioned conductive portions has essentially the same surface area so as to provide each conductive portion with essentially the same capacitance. An insulating gap separates the various conductive portions as previously described.

As in the case of the G2 screen grid 310 shown in FIG. 25 and described above, the horizontal spacing between adjacent vertically aligned beam-passing apertures is given by the distance $S_H$ in G1 control grid 380. Thus, the distance between the two outer vertically aligned arrays of beam-passing apertures is given by the distance $2S_H$ in G1 control grid 380. Similarly, the vertical spacing between adjacent apertures in each of the three vertically aligned groups of apertures is given by the distance $S_V$. Spacing between the upper and lower beam-passing apertures within each trio of vertically aligned beam-passing apertures is given by the distance $2S_V$. In the preferred embodiments of the G1 control grid 380 and G2 screen grid 354, $S_V$ is between 1/20 and 1/2 of $S_H$ or $$1/20\ S_H \leq S_V \leq 1/2\ S_H.$$

where $S_H$=the beam-to-beam center line spacing along the horizontal direction
and
$S_V$=the beam-to-beam center line spacing along the vertical direction.

There has thus been shown a multi-beam electron gun for a color CRT which includes a plurality of vertically spaced, horizontal inline electron beams which form a matrix of spots on the CRT's display screen. Each horizontal array of beams provides the three primary colors of red, green and blue and are converged on a common spot on the display screen. Adjacent vertically aligned inline beam arrays trace adjacent horizontal scan lines on the CRT's display screen. All of the beams are deflected in unison across the screen. Each inline array of beams is modulated in accordance with that portion of the video image which they form allowing adjacent, vertically spaced inline arrays to write different video image information on the screen in simultaneously forming adjacent portions of the video image. The multi-beam electron gun may be any of the more conventional types used in color CRTs such as a bi-potential or a quadrupole electron gun. The electron beams may be modulated by providing video signals to each of a plurality of conductive portions each containing a beam-passing aperture in the G1 control grid or two individual cathodes each aligned with a respective aperture in the G1 control grid. Simultaneously providing video information on more than one horizontal scan line allows for a reduction in horizontal scan frequency and associated magnetic deflection yoke operating criteria. Reducing the scan rate of the electron beams also increases beam dwell time on the screen's phosphor elements allowing for a reduction in beam current density without sacrificing video image brightness while improving video image resolution. In a preferred embodiment, with the horizontal-spacing between vertically aligned arrays of beam-passing apertures in the G1 control grid and G2 screen grid given by the distance $S_H$ and the vertical spacing between adjacent vertically aligned beam-passing apertures given by $S_V$, $S_V$ is between one-twentieth (1/20) and one-half (1/2) of $S_H$, or $$1/20\ S_H \leq S_V \leq 1/2\ S_H.$$

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. An inline electron gun for a multi-beam color cathode ray tube (CRT) including a display screen whereon a video image is formed by sweeping a plurality of horizontally aligned electron beams over a plurality of vertically spaced, horizontal scan lines in a raster-like manner, wherein each electron beam provides one of the three primary colors of red, green or blue of the video image, said electron gun comprising:

cathode means for providing energetic electrons;
a beam forming region (BFR) disposed adjacent to said cathode means and including first and second spaced charged, grids respectively having first and second arrays of spaced apertures for forming the energetic electrons into a plurality of beams, wherein each of said first and second arrays of apertures include upper and lower horizontally aligned apertures for passing horizontally aligned electron beams providing the three primary colors of red, green and blue for upper and lower horizontal scan lines, respectively, and wherein the apertures in said first and second arrays are further grouped in vertical alignment so as to form vertically grouped electron beams with the electron beams in each vertical group providing one of the primary colors on a respective horizontal scan line, wherein vertical spacing between adjacent upper and lower apertures is given by $S_V$ and horizontal spacing between vertically aligned groups of apertures is given by $S_H$, with $1/20\ S_H \leq S_V \leq 1/2\ S_H$, and wherein said first grid includes a plurality of first and second vertically spaced, horizontally aligned charged portions each including a respective aperture of said first array of apertures and having essentially equal capacitance;

common lens means disposed intermediate said BFR and the CRT's display screen for focusing the electron beams on the display screen; and convergence means disposed intermediate said common lens means and the display screen for converging the electron beams into an upper and lower spot on the display screen, wherein said upper and lower spots are swept over adjacent upper and lower horizontal scan lines, respectively.

2. The electron gun of claim 1 wherein said first and second arrays of apertures include three pairs of vertically aligned, grouped apertures for passing first and second vertically aligned electron beams for each of the primary colors of red, green and blue.

3. The electron gun of claim 2 wherein said first grid further includes a non-conductive portion disposed intermediate said plurality of charged portions.

4. The electron gun of claim 3 wherein said charged portions are comprised of metal and said non-conductive portion includes means for defining a gap between adjacent conductive portions.

5. The electron gun of claim 4 further comprising a first plurality of video signal sources each coupled to a respective one of said first charged portions of said first grid and a second plurality of video signal sources each coupled to a respective one of said second charged portions of said first grid for providing respective video signals thereto.

6. The electron gun of claim 5 wherein each of said first and second pluralities of video signal sources includes memory means for storing a received video signal for subsequent display on the display screen by said electron beams.

7. The electron gun of claim 6 wherein said common lens means includes at least third and fourth charged grids and wherein at least one of said third and fourth grids includes a plurality of vertically elongated, horizontally aligned apertures for passing electron beams of a common color.

8. The electron gun of claim 7 wherein said first and second charged grids are a G1 control grid and a G2 screen grid, respectively.

9. The electron gun of claim 8 wherein said third and fourth charged grids are a G3 grid and a G4 grid, respectively.

10. The electron gun of claim 9 wherein said electron gun is a bi-potential electron gun.

11. The electron gun of claim 9 said electron gun is a quadrupole electron gun.

12. An inline electron gun for multi-beam color cathode ray tube (CRT) including a display screen whereon a video image is formed by sweeping a plurality of horizontally aligned electron beams over a plurality of vertically spaced, horizontal scan lines in a raster-like manner, wherein each electron beam provides one of the three primary colors of red, green or blue of the video image, said electron gun comprising:

a plurality of cathodes for providing energetic electrons;

a beam forming region (BFR) disposed adjacent to said cathodes and including first and second spaced, charged, grids respectively having first and second arrays of spaced apertures for forming the energetic electrons into a plurality of beams, wherein each of said first and second arrays of apertures include upper, middle and lower horizontally aligned apertures for passing horizontally aligned electron beams providing the three primary colors of red, green and blue for upper, middle and lower horizontal scan lines, respectively, and wherein the apertures in said first and second arrays are further grouped in vertical alignment so as to form vertically grouped electron beams with the electron beams in each vertical group providing one of the primary colors on a respective horizontal scan line wherein vertical spacing between each of said upper, middle and lower apertures is given by $S_V$ and horizontal spacing between vertically aligned groups of apertures is given by $S_H$, with $1/20\ S_H \leq S_V \leq 1/2\ S_H$;

first, second and third video signal sources coupled to said cathodes for providing first, second and third color video signals to the electron beams directed through said upper, middle and lower horizontally aligned apertures, respectively;

common lens means disposed intermediate said BFR and the CRT's display screen for focusing the electron beams on the display screen; and convergence means disposed intermediate said common lens means and the display screen for converging the electron beams into an upper and lower spot on the display screen, wherein said upper and lower spots are swept over adjacent upper and lower horizontal scan lines, respectively.

13. A G1 control grid for a color cathode ray tube (CRT) adapted to receive energetic electrons from a cathode and to form said energetic electrons into a plurality of electron beams for horizontal displacement over a plurality of scan lines in a raster-like manner across a display screen of said CRT in forming a video image on said screen, said grid comprising:

first, second and third horizontally aligned upper conductive portions each adapted for coupling to a respective first video signal source;

first, second and third horizontally aligned lower conductive portions each adapted for coupling to a respective second video signal source;

insulating means disposed intermediate adjacent conductive portions for electrically isolating said conductive portions;

means for defining first, second and third horizontally aligned upper apertures each disposed within a respective one of said upper conductive portions, wherein each of said upper apertures passes a respective upper electron beam forming one of the primary colors of red, green and blue of a video image on the display screen and wherein said upper electron beams are horizontally displaced over a first upper scan line; and first, second and third horizontally aligned lower apertures each disposed within a respective one said lower conductive portions, wherein each of said lower apertures passes a respective lower electron beam forming one of the primary colors of red, green and blue of a video image on the display screen, and wherein said lower electron beams are horizontally displaced over a second, adjacent lower scan line, and wherein each pair of first, second and third upper and lower apertures are vertically aligned and pass electron beams forming the same primary color on the display screen, wherein vertical spacing between each of said upper and lower apertures is given by $S_V$ and horizontal spacing between vertically aligned groups of apertures is given by $S_H$, with $$1/20\ S_H \leq S_V \leq 1/2\ S_H.$$

14. The grid of claim 13 wherein said grid includes a first open end and a second opposed closed end including said conductive portions and said insulating means.

15. The grid of claim 14 wherein said upper and lower apertures are spaced on the order of 50 mils center-to-center apart.

16. The grid of claim 15 wherein each of said upper and lower apertures are spaced on the order of 50 mils center-to-center apart.

17. The grid of claim 13 wherein each of said upper and lower conductive portions have essentially the same capacitance.

18. The grid of claim 17 wherein each of said conductive portions is comprised of metal.

19. The grid of claim 18 wherein said insulating portion includes means defining an insulating gap between adjacent conductive portions.

20. The grid of claim 19 wherein said grid is comprised of a ceramic substrate having upper and lower brazed metal conductive portions.

21. The grid of claim 19 wherein said grid is comprised of a ceramic substrate having upper and lower cramped metal conductive portions.

22. The grid of claim 19 wherein said insulating means is formed by etching said upper and lower conductive portions.

* * * * *

UNITED STATES PATENT AND TRADEMARK OFFICE
CERTIFICATE OF CORRECTION

PATENT NO. : 5,557,344
DATED : September 17, 1996
INVENTOR(S) : HSING-YAO CHEN

It is certified that error appears in the above-indentified patent and that said Letters Patent is hereby corrected as shown below:

In column 13, line 9, before "voltage source 248," insert -- $V_{G2}$ --.

Signed and Sealed this

Eleventh Day of February, 1997

Attest:

BRUCE LEHMAN

*Attesting Officer*  *Commissioner of Patents and Trademarks*